United States Patent [19]
Uchishima et al.

[11] Patent Number: 5,999,579
[45] Date of Patent: *Dec. 7, 1999

[54] FADING EQUALIZER

[75] Inventors: Makoto Uchishima; Hajime Hamada, both of Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/745,085

[22] Filed: Nov. 7, 1996

[30] Foreign Application Priority Data

Mar. 8, 1996 [JP] Japan ...................................... 8-051358

[51] Int. Cl.$^6$ ................................. H04B 7/10; H01L 1/02
[52] U.S. Cl. ............................................. 375/347; 375/349
[58] Field of Search ................................... 375/230, 341, 375/346, 347, 348, 349, 229, 254, 267, 261, 285, 262, 235; 455/63, 65, 296, 501, 504, 506, 10, 277.1, 227.2, 278.1

[56] References Cited

U.S. PATENT DOCUMENTS

| | | |
|---|---|---|
| 3,633,107 | 1/1972 | Brady . |
| 4,733,402 | 3/1988 | Monsen . |
| 5,291,519 | 3/1994 | Tsurumaru . |
| 5,465,271 | 11/1995 | Hladik et al. ............... 375/267 |
| 5,481,572 | 1/1996 | Skold et al. ................ 375/347 |
| 5,648,983 | 7/1997 | Kostic et al. ............... 375/206 |
| 5,671,221 | 9/1997 | Yang ............................ 370/320 |

*Primary Examiner*—Chi H. Pham
*Assistant Examiner*—Jean B Corrielus
*Attorney, Agent, or Firm*—Helfgott & Karas, P.C.

[57] ABSTRACT

In order to avoid a floor phenomenon of an error rate without insertion of a datum signal, a fading equalizer, for which it is assumed that a series of symbols that represent quadrature detect output are I(n) and Q(n) (n: natural number) and an assumed maximum fading frequency is F(max), and which demodulates a modulation wave that is to be transmitted whose data are carried by phase or amplitude modulation, or both, of a radio frequency carrier, includes a symbol extractor, for performing sampling of a signal at time intervals of 1/(2 $F_{max}$) or smaller, in accordance with the series of symbols; N fading estimation units, for calculating a series of fading vectors $F_v(n)$ by using tentative transmission signals, signals for which likelihood is determined, and extracted symbols; N compensators, for performing fading compensation for the series of symbols by using fading that is estimated by the fading estimation units; and a selector for selecting one of a series of N symbols that are obtained by the fading compensation.

21 Claims, 17 Drawing Sheets

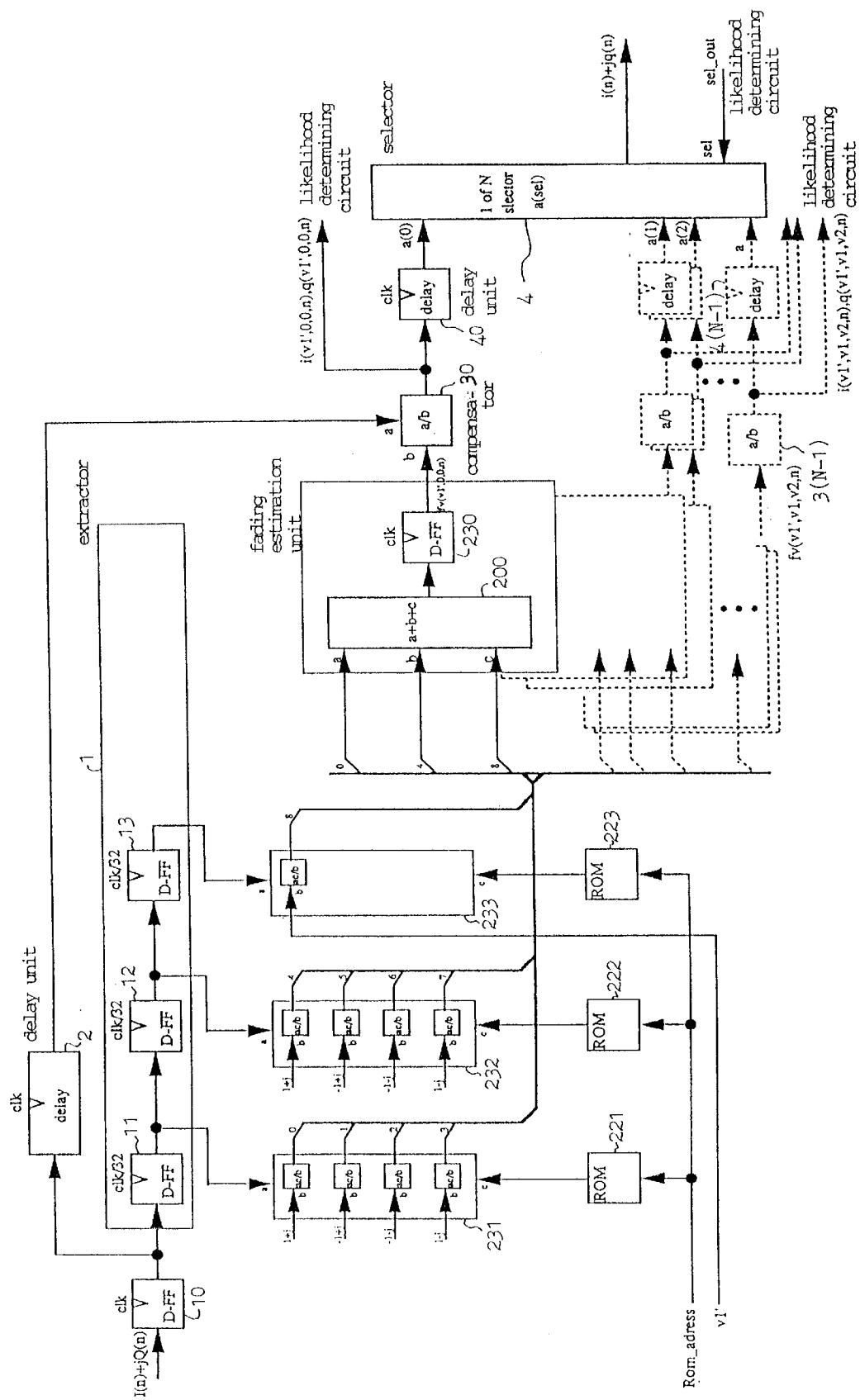
F I G. 6

FADING EQUALIZER

BACKGROUND OF THE INVENTION

1. Field of the Invention

The present invention relates to a fading equalizer, and in particular to a fading equalizer that is employed in a demodulator of a radio receiver for performing communication in a Rayleigh (uniform) fading environment, such as vehicular communication.

2. Related Arts

Recently, in consonance with the wide use of vehicular communication, high quality transmission, such as data communication, having a small error rate is demanded. Communication performed while moving, however, is affected by uniform fading according to the Doppler shift. Therefore, even for communication performed at a high average reception signal level (S/N), line or channel quality is not improved and data transmission efficiency is not enhanced.

Assume that a series of symbols that represent quadrature detect output are I(n) and Q(n) (n: natural number); a clock having a natural number, which is an integral times a symbol rate $R_s$ that is synchronous with the symbol sequence, is $S_{CLK}$; and a presumed maximum fading frequency, so called a Doppler frequency is $F_{max}$.

A conventional demodulator adopts a delay detect method that is comparatively less affected by uniform fading. In addition, there is another method whereby a datum signal, which is a known signal is inserted at intervals of equal to or smaller than $1/(2F_{max})$ on the transmission side, and a reception side utilizes the datum signal to compensate for fading.

However, in the delay detecting method, even through the average reception signal level is high, the line quality, that is a bit error rate is not improved, and this is so called as error rate floor phenomenon.

In the fading compensation method whereby a datum signal is inserted, although the floor phenomenon for an error rate can be avoided, data transfer efficiency is reduced because of the insertion of a datum signal.

SUMMARY OF THE INVENTION

It is, therefore, one object of the present invention to provide a fading equalizer that prevents a floor phenomenon for an error rate without the insertion of a datum signal.

It is a further object of the present invention to provide a fading equalizer which can estimate fading without deterioration of data transfer efficiency.

It is a still further object to provide a fading equalizer by which fading compensation can be performed.

It is a more object to provide a fading equalizer by which an occurrence of a floor phenomenon of a bit error rate (BER) can be prevented, and the functions of a receiver can be enhanced.

BRIEF DESCRIPTION OF THE DRAWINGS

FIG. 6 is a diagram illustrating a modification of the first embodiment;

DETAILED DESCRIPTION OF THE PREFERRED EMBODIMENTS

Figure 1:
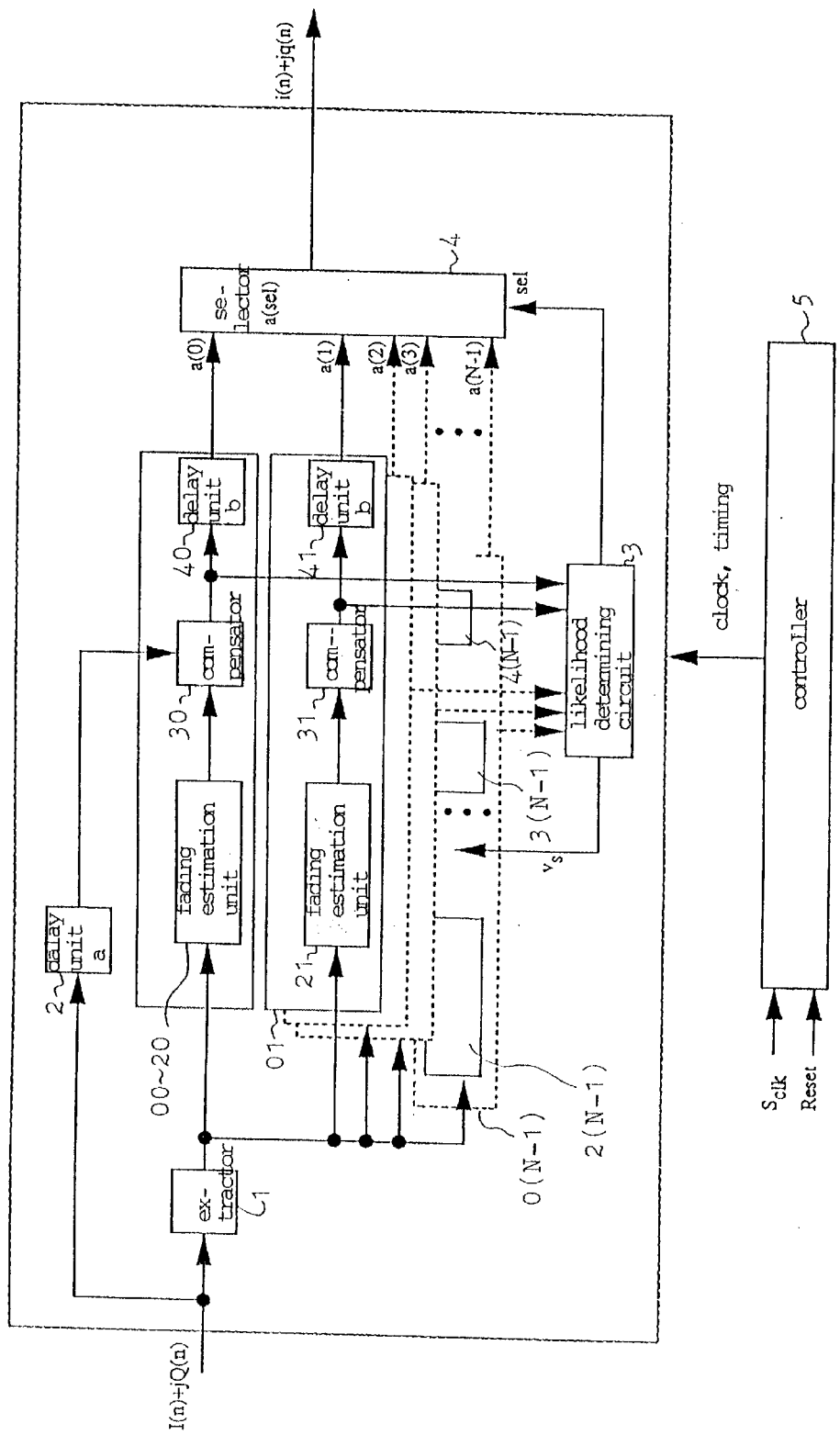
FIG. 1 is a block diagram illustrating a fading equalizer according to a first embodiment of the present invention.

The preferred embodiments of the present invention will now be described while referring to the accompanying drawings. Like or identical reference numerals are used to denote corresponding or identical components.

Before beginning the description of the embodiments of the present invention, so that the present invention may be understood, the reason that the floor phenomenon of an error rate occurs in the prior art will be explained by using a QPSK (Quadrature Phase Shift Keying) modulation method. The reason that an occurrence of the floor phenomenon of an error rate can be prevented, so long as a datum signal, which is a known signal is inserted, will also be explained.

[Reason for that a floor phenomenon of an error rate occurs]

Assuming that a series of symbols that represent quadrature detect output by the QPSK demodulator are i(n) and q(n) and that a fading vector is $f_v(n)$ (n: natural number), I(n) and Q(n) can be represented by the following expressions (1) through (3). It should be noted here that there is no noise (S/N is sufficiently high).

$$I(n)+jQ(n)=\{i(n)+jq(n)\}\times f_v(n) \tag{1}$$

$$I(n)=Re[(i(n)+jq(n))\times f_v(n)] \tag{2}$$

$$Q(n)=Im[(i(n)+jq(n))\times f_v(n)] \tag{3}$$

Delay detecting outputs $I_d(n)$ and $Q_d(n)$ can be represented by the following expressions (4) and (5).

$$I_d(n)=Re[\{I(n)+jQ(n)\}/\{I(n-1)+jQ(n-1)\}] \tag{4}$$

$$Q_d(n)=Im[\{I(n)+jQ(n)\}/\{I(n-1)+jQ(n-1)\}] \tag{5}$$

When expressions (2) and (3) are substituted into expressions (4) and (5), the following expressions (6) and (7) are yielded.

$$I_d(n) = \text{Re}\left[\frac{i(n)+jq(n)}{i(n-1)+jq(n-1)} \times \frac{f_v(n)}{f_v(n-1)}\right] \quad (6)$$

$$Q_v(n) = \text{Im}\left[\frac{i(n)+jq(n)}{i(n-1)+jq(n-1)} \times \frac{f_v(n)}{f_v(n-1)}\right] \quad (7)$$

From expressions (6) and (7) above, when the phase elements $f_v(n)/f_v(n-1)$ are not within $\pm\pi/4$, although it is assumed there is no noise, an error occurs in both, or one, of $I_d(n)$ and $Q_d(n)$. This is why the error rate can not be improved or the floor phenomenon of an error rate occurs, even when the S/N is enhanced.

[Reason for that a floor phenomenon of an error rate can be prevented by insertion of a datum signal]

Assume that a datum signal is inserted at intervals of $1/(2 F_{max})$ or smaller. To simplify the explanation, assuming that a datum signal is inserted at equal intervals, datum signals in the transmission series can be represented by expression (8) below:

$$i(mk)+jq(mk)=U_i+jU_q \quad (8)$$

where m denotes an insertion interval for a datum signal and k denotes a natural number. Thus, the fading $f_v(mk)$ may be fixed:

$$f_v(mk)=(I(mk)+jQ(mk))/U_i+jU_q \quad (9)$$

After $f_v(mk)$ is fixed by expression (9), according to Nyquist's theorem, $f_v(mk)$ is input to an appropriate low-pass filter, as is shown by expression (10), and then all values of $f_v(n)$ may be obtained.

$$f_v(n) = f_v(mk-g) = \sum_{h=-\infty}^{\infty} a(mh-g) \times f_v(m(k+h)) \quad (10)$$

The g denotes a natural number that is equal to or smaller than m, and a( ) denotes an impulse response by a low-pass filter. Although the expression (10) requires an indefinite multiplication and addition count, namely sampling count $r=\infty$ for fading estimation, calculation may be halted when a result is small enough to be ignored.

Therefore, i(n) and q(n) can be calculated by substituting $f_v(n)$, which is acquired in this manner, into expressions (2) and (3), and the occurrence of the floor phenomenon of the error rate can be prevented. Since in actuality there is noise, the $f_v(n)$ that can be acquired in the above manner is an estimated value for a true $F_v(n)$.

[Reason for that an occurrence of the floor phenomenon of an error rate can be avoided without requiring the insertion of a datum signal]

In the present invention, to simplify the explanation of the reason that the floor phenomenon of an error rate can be prevented without a datum signal, the multiplication and addition count required for expression (10) is assumed to be three (r=3, $-1 \leq h \leq 1$). Therefore, expression (10) can be represented as expression (11) below.

$$f_v(n) = f_v(mk-g) = \sum_{h=-1}^{1} a(mh-g) \times f_v(m(k+h)) \quad (11)$$

When a datum signal is not inserted, $f_v(mk)$ is unknown. Therefore, in this invention, first, $f_v(mk)$ is calculated relative to all of the signal patterns that are to be transmitted. Since the transmittable signal patterns for QPSK modulation consist of four types (1+j), (-1+j), (-1-j) and (1-j), the $f_v(mk)$ values that are calculated by using these patterns are assumed to be $f_v(0, mk)$, $f_v(1, mk)$, $f_v(2, mk)$, and $f_v(3, mk)$, respectively.

All combinations of the four types of $f_v$ are substituted in expression (11), and $4^3$ $f_v$ can be yielded. The $f_v(n)$ values that are obtained by using $f_v(v0, m(k-1))$, $f_v(v1, mk)$ and $f_v(v2, m(k+1))$ are described as $f_v(v0, v1, v2, n)$, where each of v0, v1, v2 and v3 is 0 or 1 or 2 or 3).

These $f_v(v0, v1, v2, n)$ values are substituted into expression (1) to obtain i(n) and q(n) for $m(k-1) \leq n \leq mk-1$. The thus acquired i(n) and q(n) are described as $i(v0, v1, v2, n)$ and $q(v0, v1, v2, n)$. Therefore, when v0, v1 and v2, with which the likelihood becomes most, referred to as v0', v1' and v2', can be determined, the most likelihood i(n) and q(n) [=i(v0' v1', v2', n) and q(v0', v1', v2', n)] can be selected.

Next, to calculate v0', v1' and v2', distances d(v0, v1, v2, n), from signal points i(v0, v1, v2, n) and q(v0, v1, v2, n) to the closest QPSK signal point, are calculated by the following expression (12):

$$d(v0, v1, v2, n) = [\text{Re}\{S - i(v0, v1, v2, n)\}]^2 + [\text{Im}\{S - jq(v0, v1, v2, n)\}]^2 \quad (12)$$

where $S=\pm1\pm j$ and is a nearest signal point.

The present inventors confirmed that substantially the same characteristic can be acquired by the following expression (13) instead of expression (12):

$$d(v0, v1, v2, n) = |Re\{S - i(v0, v1, v2, n)\}| + |Im\{S - jq(v0, v1, v2, n)\}| \quad (13)$$

A value[distance $M_b$ (v0, v1, v2, k) in one interval] obtained by accumulating the distance d by one interval (m) is calculated by using the following expression (14):

$$M_b(v0, v1, v2, k) = \sum_{g=1}^{m} d(v0, v1, v2, mk-g) \quad (14)$$

The likelihood becomes greater as the value of the distance function $M_b$ becomes smaller, and v0, v1 and v2 to provide a minimum $M_b$ are v0', v1' and v2'. Therefore, when i(v0', v1', v2', n) and q(v0', v1', v2', n) are selected as output within the range $m(k-1) \leq n \leq mk-1$, the occurrence of the floor phenomenon of an error rate can be prevented.

Many digital modulation systems have uncertainties in phases of 90 degrees or 180 degrees; for example, the QPSK modulation system has uncertainties in phase of 90 degrees. Thus, the relationship represented by expression (15) below is obtained from the expression (11).

$$f_v(1, 1, 1, n) = f_v \ (0, 0, 0, n) \times j \quad (15)$$
$$f_v(2, 2, 2, n) = f_v \ (0, 0, 0, n) \times j^2$$
$$f_v(3, 3, 3, n) = f_v \ (0, 0, 0, n) \times j^3$$
$$f_v(1, 1, 2, n) = f_v \ (0, 0, 1, n) \times j$$
$$f_v(2, 2, 3, n) = f_v \ (0, 0, 1, n) \times j^2$$
$$f_v(3, 3, 0, n) = f_v \ (0, 0, 1, n) \times j^3$$
$$f_v(1, 1, 3, n) = f_v \ (0, 0, 2, n) \times j$$
$$f_v(2, 2, 0, n) = f_v \ (0, 0, 2, n) \times j^2$$
$$f_v(3, 3, 1, n) = f_v \ (0, 0, 2, n) \times j^3$$
$$\vdots$$
$$f_v(1, 0, 0, n) = f_v \ (0, 3, 3, n) \times j$$
$$f_v(2, 1, 1, n) = f_v \ (0, 3, 3, n) \times j^2$$
$$f_v(3, 2, 2, n) = f_v \ (0, 3, 3, n) \times j^3$$

As a result, a relationship represented by the following expression (16) is obtained from expressions (1), (12), (14) and (15).

$$M_b \ (0,0,0,k) = M_b \ (1,1,1,k) = M_b \ (2,2,2,k) = M_b \ (3,3,3,k) \quad (16)$$
$$M_b \ (0,0,1,k) = M_b \ (1,1,2,k) = M_b \ (2,2,3,k) = M_b \ (3,3,0,k)$$
$$M_b \ (0,0,2,k) = M_b \ (1,1,3,k) = M_b \ (2,2,0,k) = M_b \ (3,3,1,k)$$
$$M_b \ (0,0,3,k) = M_b \ (1,1,0,k) = M_b \ (2,2,1,k) = M_b \ (3,3,2,k)$$
$$\vdots$$
$$M_b \ (0,3,1,k) = M_b \ (1,0,2,k) = M_b \ (2,1,3,k) = M_b \ (3,2,0,k)$$
$$M_b \ (0,3,2,k) = M_b \ (1,0,3,k) = M_b \ (2,1,0,k) = M_b \ (3,2,1,k)$$
$$M_b \ (0,3,3,k) = M_b \ (1,0,0,k) = M_b \ (2,1,1,k) = M_b \ (3,2,2,k)$$

Then, from expression (15), 64 calculations are reduced to 16, and v1' obtained the previous time can be used as v0 because of the continuity of data.

Further, a long continuity for data is employed to increase the accuracy of the likelihood. Specifically, a path distance $M_p$, which is obtained by accumulation of the interval distances $M_b$, is defined in order to determine which path has the minimum $M_p$, that is, most likelihood path. The path distance is acquired by expression (17) below.

$$M_p(W_0, W_1, W_2, \ldots, W_1) =$$

$$M_b(W_0, W_1, W_2, 1) + M_b(W_1, W_2, W_3, 2) + \ldots + M_b(W_{i-2}, W_{i-1}, W_1, i-1) \quad (17)$$

where $W_0, W_1, W_2, \ldots, W_1$ are respectively 0, 1, 2, or 3.

A path having the minimum distance value $M_p$ serves as a most likelihood path, and at this time i(n) and q(n) may be selected as output within the range $m(i-c-1) \leq n \leq m(i-c)$. Although c has the most likelihood when $c=\infty(i=\infty)$, in actuality, c needs only an appropriate value to provide substantially the same characteristic.

Since a large number of calculations is required to obtain a minimum path distance, the Viterbi-algorithm (Trellis diagram) is applied. The employment of the Viterbi-algorithm for the present invention will now be described.

To calculate $\min(M_p)$, a path distance of $D^{i-1} = 4^{i-1}$ must be acquired and the minimum value must be searched for. Since this is actually impossible, the Viterbi-algorithm is applied as follows.

First, consider the first three sampling points.

$\min\{M_p(*_0, *_1, *_2)\}$ ($\min\{\text{function}(*)\}$ represents a minimum value when all available values are substituted into (*)) is performed in the same manner as when expressions (14) and (16) are used to calculate the interval distance and to obtain a minimum value. The first three sampling points are obtained in the following order (i) through (iv).

(i) The path distances for the three sampling points are calculated by using expression (18). It should be noted that $M\min(W_0, W_1) = 0$.

$$M_p \ (0,0,0) = M_p \ (1,1,1) = M_p \ (2,2,2) = M_p \ (3,3,3) = M_b \ (0,0,0,1) + M\min(0,0) \quad (18)$$
$$M_p \ (0,0,1) = M_p \ (1,1,2) = M_p \ (2,2,3) = M_p \ (3,3,0) = M_b \ (0,0,1,1) + M\min(0,0)$$
$$M_p \ (0,0,2) = M_p \ (1,1,3) = M_p \ (2,2,0) = M_p \ (3,3,1) = M_b \ (0,0,2,1) + M\min(0,0)$$
$$M_p \ (0,0,3) = M_p \ (1,1,0) = M_p \ (2,2,1) = M_p \ (3,3,2) = M_b \ (0,0,3,1) + M\min(0,0)$$
$$M_p \ (0,1,0) = M_p \ (1,2,1) = M_p \ (2,3,2) = M_p \ (3,0,3) = M_b \ (0,1,0,1) + M\min(0,1)$$
$$\vdots$$
$$M_p \ (0,3,3) = M_p \ (1,0,0) = M_p \ (2,1,1) = M_p \ (3,2,2) = M_b \ (0,3,3,1) + M\min(0,3)$$

(ii) The distance is divided into four small groups, and the minimum values $\min\{M_p(*, 0, 0)\}$, $\min\{M_p(*, 0, 1)\}$, $\min\{M_p(*, 0, 2)\}$ and $\min\{M_p*, 0, 3)\}$ are calculated and Mmin is updated as is shown by expression (19) below.

$$\left. \begin{array}{l} M\min(0,0) = M\min(1,1) = M\min(2,2) = M\min(3,3) = \min\ \{M_p(*,0,0)\} \\ M\min(0,1) = M\min(1,2) = M\min(2,3) = M\min(3,0) = \min\ \{M_p(*,0,1)\} \\ M\min(0,2) = M\min(1,3) = M\min(2,0) = M\min(3,1) = \min\ \{M_p(*,0,2)\} \\ M\min(0,3) = M\min(1,0) = M\min(2,1) = M\min(3,2) = \min\ \{M_p(*,0,3)\} \end{array} \right\} \quad (19)$$

(iii) The smallest value for the minimum values of the four small groups is calculated as follows:

$\min\{M_p(*0, *1, *2)\} = \min\{M\min(0, *3)\}$.

Four sampling points are considered in the same manner.

The path distances for the four sampling points are calculated by using expressions (1), (14) and (19) to yield the following expression (20) and (21).

$$\left. \begin{array}{l} \min\ \{M_p(*,0,0,0)\} = M_b(0,0,0,2) + M\min(0,0) \\ \min\ \{M_p(*,0,0,1)\} = M_b(0,0,1,2) + M\min(0,0) \\ \min\ \{M_p(*,0,0,2)\} = M_b(0,0,2,2) + M\min(0,0) \\ \min\ \{M_p(*,0,0,3)\} = M_b(0,0,3,2) + M\min(0,0) \\ \min\ \{M_p(*,0,1,0)\} = M_b(0,3,3,2) + M\min(0,1) \\ \quad\quad \vdots \\ \min\ \{M_p(*,0,3,3)\} = M_b(0,3,3,2) + M\min(0,3) \end{array} \right\} \quad (20)$$

$$\left. \begin{array}{l} \min\ \{M_p(*,0,0,0)\} = \min\ \{M_p(*,1,1,1)\} = \min\ \{M_p(*,2,2,2)\} = \min\ \{M_p(*,3,3,3)\} \\ \min\ \{M_p(*,0,0,1)\} = \min\ \{M_p(*,1,1,2)\} = \min\ \{M_p(*,2,2,3)\} = \min\ \{M_p(*,3,3,0)\} \\ \min\ \{M_p(*,0,0,2)\} = \min\ \{M_p(*,1,1,3)\} = \min\ \{M_p(*,2,2,0)\} = \min\ \{M_p(*,3,3,1)\} \\ \min\ \{M_p(*,0,0,3)\} = \min\ \{M_p(*,1,1,0)\} = \min\ \{M_p(*,2,2,1)\} = \min\ \{M_p(*,3,3,2)\} \\ \min\ \{M_p(*,0,1,0)\} = \min\ \{M_p(*,1,2,1)\} = \min\ \{M_p(*,2,3,2)\} = \min\ \{M_p(*,3,0,3)\} \\ \quad\quad \vdots \\ \min\ \{M_p(*,0,3,3)\} = \min\ \{M_p(*,1,0,0)\} = \min\ \{M_p(*,2,1,1)\} = \min\ \{M_p(*,3,2,2)\} \end{array} \right\} \quad (21)$$

In the same manner as for the three sampling points, Mmin is updated as is indicated by expression (22) below.

$$\left. \begin{array}{l} M\min(0,0) = \min\ \{M_p(*_0, *_1, 0, 0)\} \\ M\min(0,1) = \min\ \{M_p(*_0, *_1, 0, 1)\} \\ M\min(0,2) = \min\ \{M_p(*_0, *_1, 0, 2)\} \\ M\min(0,3) = \min\ \{M_p(*_0, *_1, 0, 3)\} \end{array} \right\} \quad (22)$$

(iv) $\min\{M_p(*_0, *_1, *_2, *_3)\} = \min\{M\min(0, *_4)\}$ is calculated.

As a result, the minimum path distance for the four sampling points is selected from the four distances shown in expressions (20) and (22). In other words, just as for the three sampling points, only 16 interval distances need be calculated for the four sampling points to acquire the minimum path distance.

Focusing on the fact that expressions (20) and (18) have the same form, and that the expressions (19) and (22) have the same form, the calculation of the minimum path distance for five sampling points, and the calculation of the following points can be performed in the same manner.

As a result, by performing only 16 interval distance calculations and 16 path distance calculations, the minimum path distance can be acquired any time. A general explanation of this process will be given.

(i) At sampling point i+1, path distances are calculated by using expressions (1), (14) and (19) to yield expressions (23) and (24):

$$\min\{M_p(*_0, *_1, \ldots, *_{i-3}, 0, w_{i-1}, w_1)\} = M_b(0, w_{i-1}, w_1) + M\min(0, w_{i-1}) \quad (23)$$

$$\min\{M_p(*_0, *_1, \ldots, *_{i-2}, \delta, w_1)\} = \min\{M_p(*_0, \ldots, *_{i-3}, 0, (w_{i-1}-\delta).\text{mod}.4, (w_1-\delta).\text{mod}.4)\} \quad (24)$$

where $\delta=1$ or 2 or 3

(ii) Mmin is updated as is represented by expression (25) below:

$$\left. \begin{array}{l} M\min(0,0) = \min\ \{M_p(*_0, *_1, \cdots, *_{i-3}, *_{i-2}, 0, 0)\} \\ M\min(0,1) = \min\ \{M_p(*_0, *_1, \cdots, *_{i-3}, *_{i-2}, 0, 1)\} \\ M\min(0,2) = \min\ \{M_p(*_0, *_1, \cdots, *_{i-3}, *_{i-2}, 0, 2)\} \\ M\min(0,3) = \min\ \{M_p(*_0, *_1, \cdots, *_{i-3}, *_{i-2}, 0, 3)\} \end{array} \right\} \quad (25)$$

(iii) The minimum path distance is yielded as expression (26):

$$\min\{M_p(*_0, *_1, \ldots, *_i)\} = \min\{M\min(*_{i+1}, *_{i+2})\} \quad (26).$$

The calculation of expressions (23) and (25) is called ACS (Add, Compare, Select) because addition is performed to compare the results and a minimum value is selected. However, while the minimum path distance and its path $w_i$ are acquired by expression (26), $w_{i-c-1}$, $w_{i-c}$, and $w_{i-c+1}$ are not obtained. During the calculation of expression (25), therefore, the process of selection using a small group must be stored as is shown below:

$$P_m(w_{i-1}, w_i, i-2) = w_{i-2} \quad (27).$$

The $P_m$(path memory) is traced back c times to acquire $w_{i-c-1}$, $w_{i-c}$ and $w_{i-c+1}$ for the path having the most likelihood, and to determine the output of the most likelihood path that has a minimum path distance, $\{i(w_{i-c-1}, w_{i-c}, w_{i-c+1}, n), q(w_{i-c-1}, w_{i-c}, w_{i-c+1}, n); m(i-c-1) \leq n \leq m(i-c)-1\}$. It should be noted that since expression (25) is applied when $w_{i-1}=0$, only the expression (28) is obtained;

$$P_m(0, w_i, i-2) = w_{i-2} \qquad (28).$$

When $w_{i-1} \neq 0$, expression (29) below is used to calculate the most likelihood path.

$$P_m(w_{i-1}, w_1, i-2) = \{P_m(0, w_1 \cdot w_{i-1}, i-2) + w_{i-i-1}\}.\bmod.4 \qquad (29)$$

An explanation will now be given for a first embodiment of a fading equalizer by which to perform the above procedures of the present invention. In FIG. 1 is shown the arrangement of the fading equalizer according to the first embodiment of the present invention. A basic configuration includes N fading calculators 0 through (N-1), and a selector 4 for selecting output 1, from among the outputs by the fading calculators 00 through 0(N-1), in consonance with the output of a likelihood determining circuit 3. As is apparent from the above explanation, N=16 because 16 calculations are required for the combinations of all of the transmission signals.

N fading calculators 00 to 0(N-1) have the same structure. The series of symbols I(n) and Q(n) are transmitted from a quadrature detector (not shown) to the input terminal of the fading equalizer. An extractor 1 performs sampling of I(mk) and Q(mk) in the series of symbols I(n) and Q(n). N fading estimation units 20 through 2(N-1) having the same structure employ the sampled data to perform all of the calculations for $f_v(v0, v1, v2, n)$.

It should be noted that v1' was previously employed as v0. In the following description, therefore, as it was previously employed, v0 equals v1'. The initial value v0(=v1') is an arbitrary value.

Following this, N compensators 30 through 3(N-1) employ $f_v(v0, v1, v2, n)$ Q(n) [M(k-1)≤n≤mk-1], and expressions (2) and (3) to calculate i(v0, v1, v2, n) and q(v0, v1, v2, n).

Since the calculation time for estimating fading is required at this time, a first delay unit (a) 2 delays I(n) and Q(n) to adjust them to the timing $f_v(v0, v1, v2, n)$ input by the compensators 30 through 3(n-1).

The likelihood determining circuit 3 employs outputs i(v0, v1, v2, v2, n) and q(v0, v1, v2, n) from the N compensators 30 through 3(N-1) and expressions (12), (14) and (17) to determine v1' and v2'. i(v0, v1', v2', n) and q(v0, v1', v2', n), which include the determined v1' and v2', are finally selected by the selector 4 and output.

Since the calculation time for acquiring a likelihood is required at this time, delay units (b) 40 through 4(N-1) that are respectively connected to the compensators 30 to 3(N-1) delay i(v0, v1, v2, n) and q(v0, v1, v2, n) to adjust them to the timing for a selection signal that is input by the likelihood determining circuit 3 to the selector 4.

In FIG. 1, based on a system clock $S_{CLK}$ and a reset signal "Reset", a controller 5 generates an operating clock and a timing signal for the individual sections.

Figure 2:
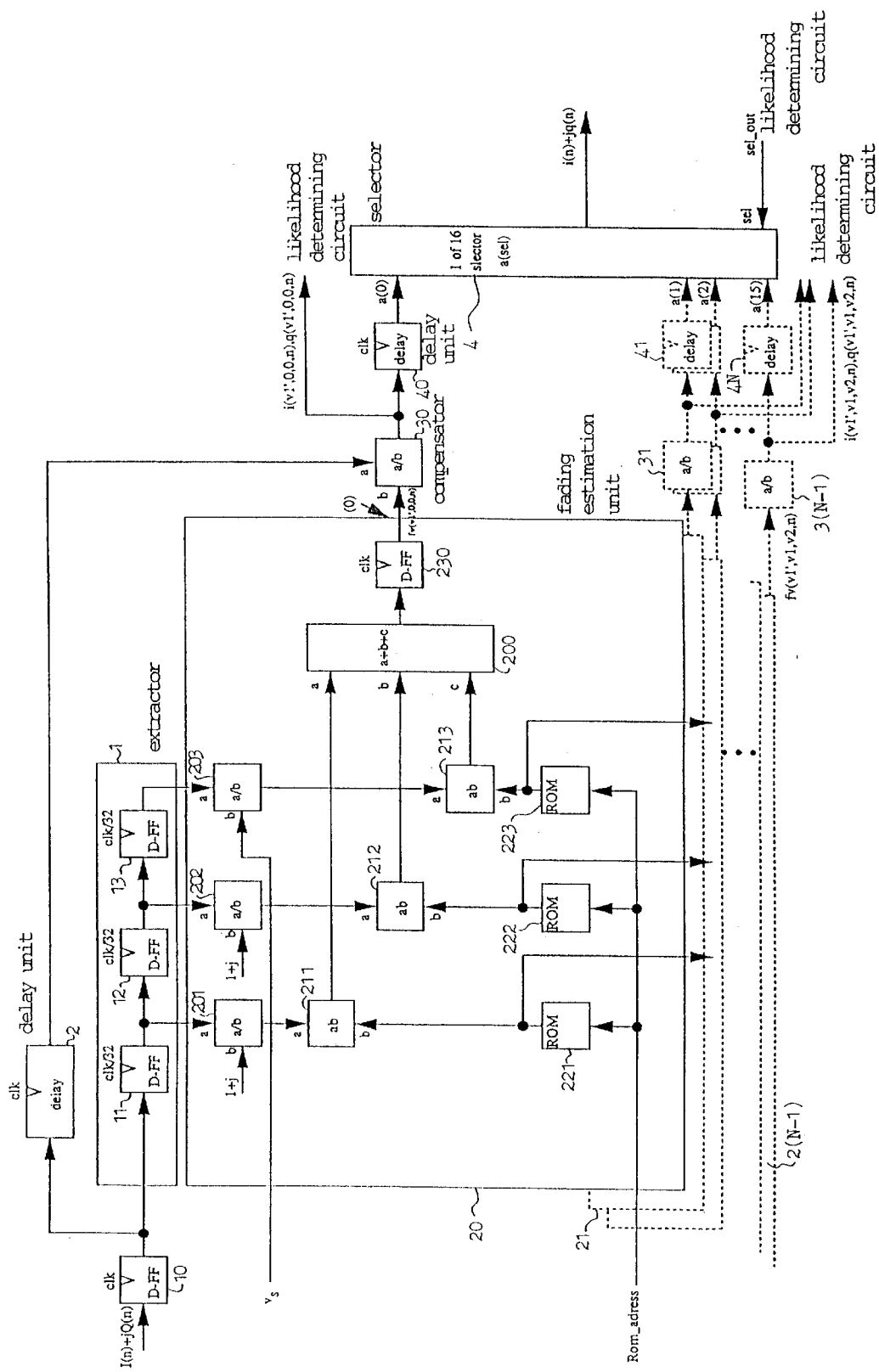
FIG. 2 is a detailed block diagram illustrating a first example arrangement in FIG. 1 according to the first embodiment of the present invention.
Figure 3:
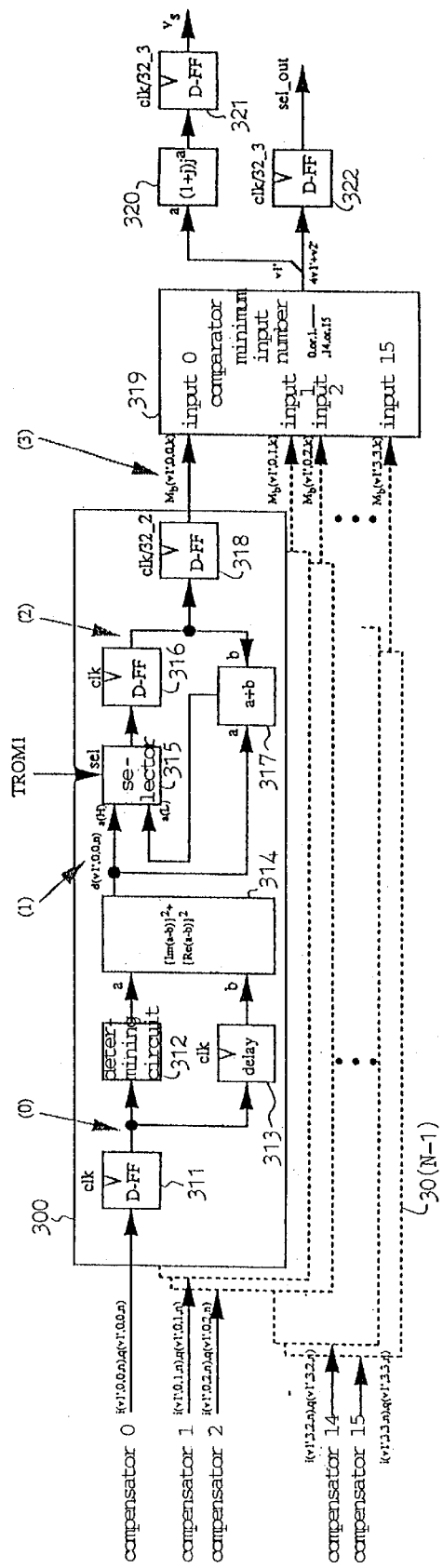
FIG. 3 is a detailed block diagram illustrating a first example likelihood determining circuit in FIG. 1.
Figure 4:
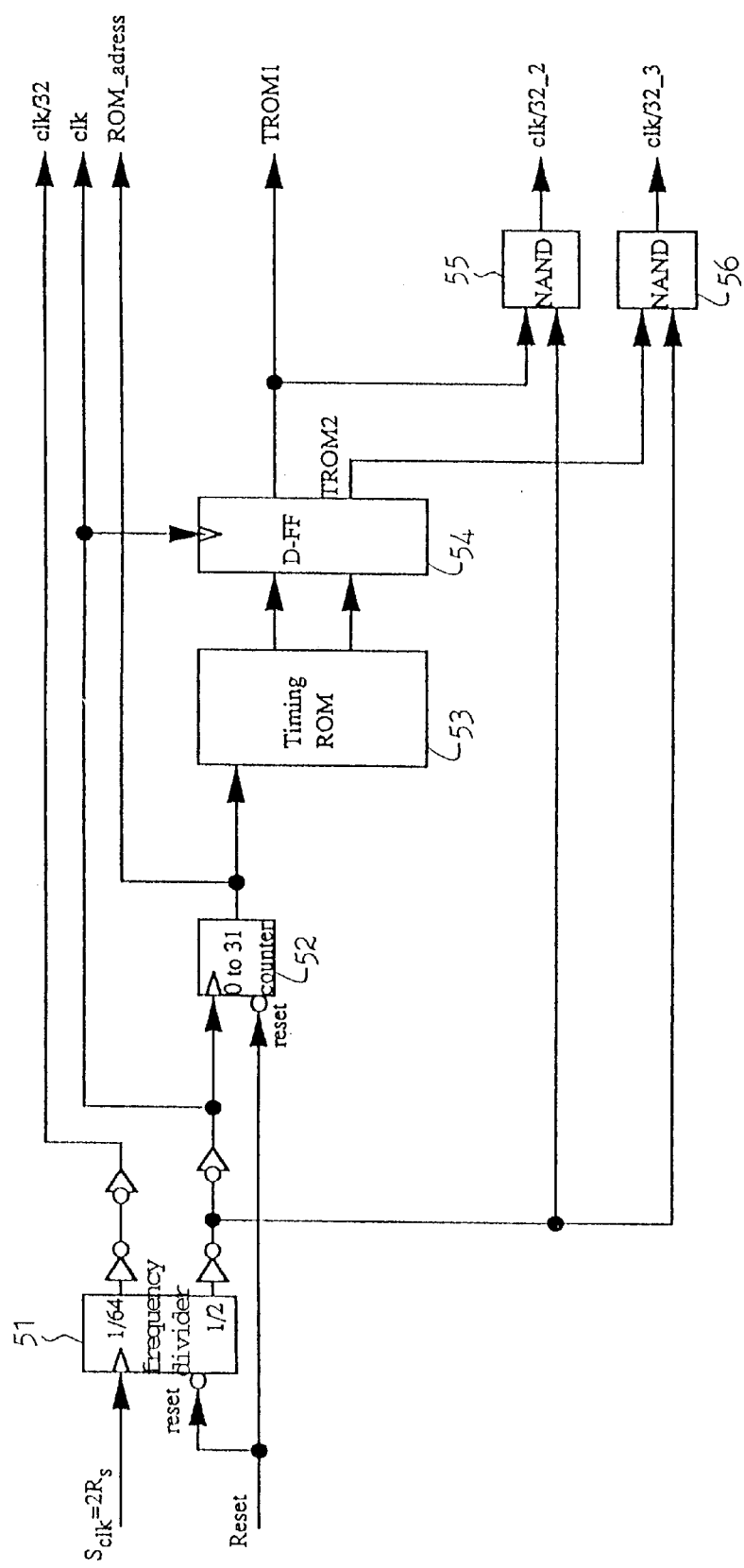
FIG. 4 is a detailed block diagram illustrating a first example controller in FIG. 1.

FIGS. 2, 3 and 4 are detailed block diagrams illustrating the arrangement in FIG. 1. In FIG. 2 are shown the extractor 1, the fading estimation units 20 through 2(N-1), the compensators 30 through 3(N-1), the selector 4, and the delay units (a) 2 and (b) 40 through 4(N-1). It should be noted that since there are 16 calculations, N=16.

Figure 5:
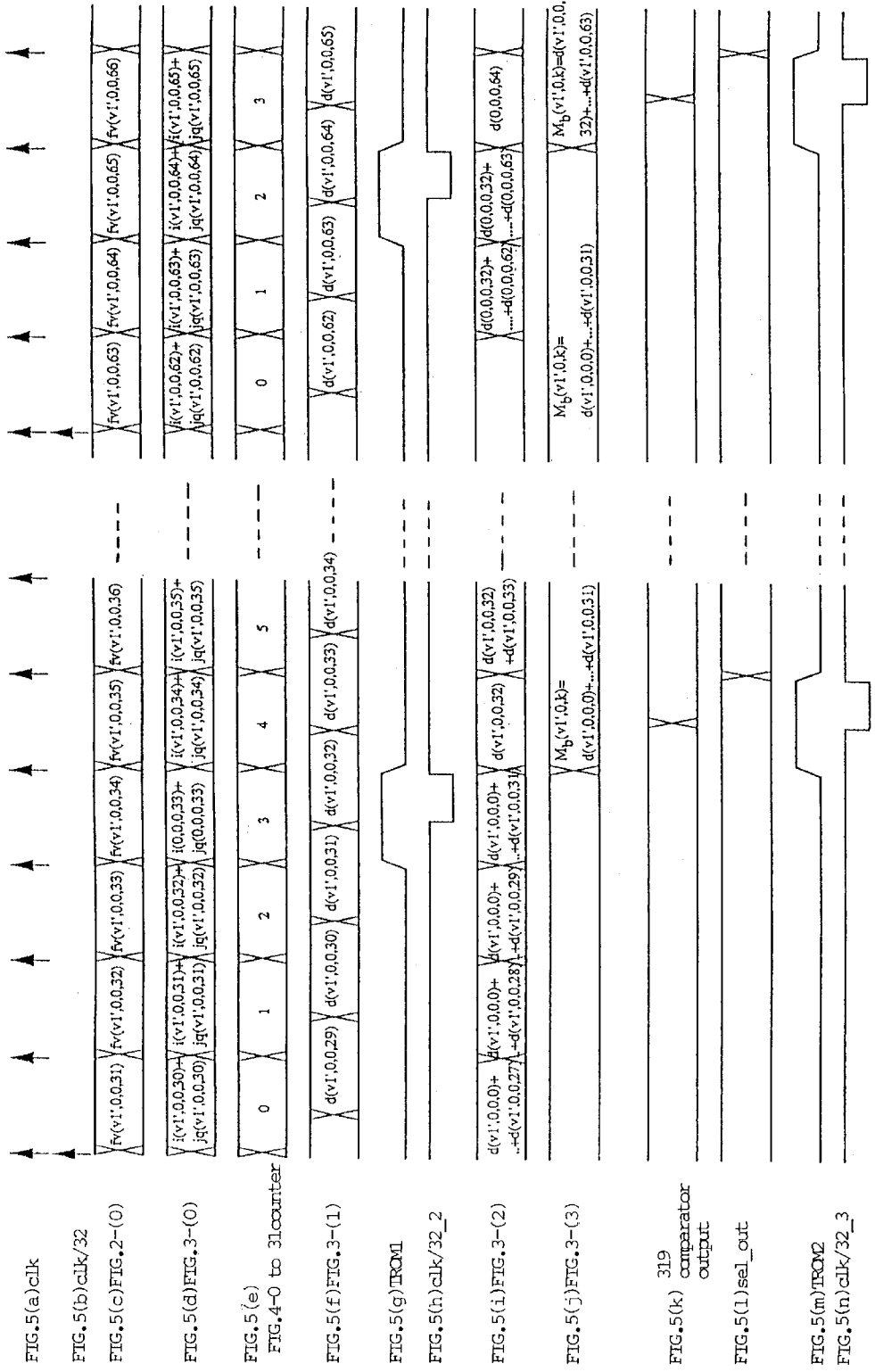
FIGS. 5(a)–5(n) are timing charts for the operations of individual sections in the first embodiment.

FIG. 3 is a block diagram illustrating the likelihood determining circuit 3 in FIG. 1. The likelihood determining circuit 3 employs an interval distance $M_L$. Another type of likelihood determining circuit that uses a path distance $M_p$ will be described later. FIG. 4 is a block diagram illustrating the controller 5. FIG. 5 is a timing chart, and the same reference numerals and symbols are used to denote operation timings for corresponding components in FIGS. 2 through 4.

In this embodiment, the sampling interval m=32, the sample count required for fading estimation r=3, the symbol signal point count D=4 (presuming that the QPSK is employed), and $S_{CLK}=2R_s$. In FIG. 5, signal I(n)+jQ(N) is provided across two buses: a bus along which a real axial element I(n) of a received signal is carried, and a bus along which an imaginary axial element Q(n) is carried.

In FIG. 2, the extractor 1 includes three-stage D-FFs 11 through 13, and performs sampling of input data [I(n)+jQ(n)], which has been latched by a D-FF 10 in accordance with a clock (clk/32) that is generated by the controller 5.

Each of the fading estimation units 20 through 2(N-1) comprises: dividers 201 through 203 that receive the outputs of the respective three-stage D-FFs 11 to 13; multipliers 211 through 213 that receive the outputs of the dividers 201 to 203; an adder 200 that adds together the outputs of the multipliers 211 through 213; ROMs 221 through 223 to which the outputs of the multipliers 211 through 213 are input; and a D-FF 230 that adjusts the timing for the output of the adder 200.

This arrangement in FIG. 2 is employed when both sampling signals are 1+j. First, expression (9) is calculated by the dividers 201, 202 and 203, and $f_v$(mk) is output. Then, the multipliers 211 through 213 and the adder 200 perform expression (10), the multiplication and addition of the output $f_v$(mk) and outputs $\{a( )\}$ from the ROMs 201, 202 and 203.

As a result, $f_v(v1', 0, 0, n)$ is output. In the same manner, the remaining 15 (=N-1) fading estimation units 21 through 2(N-1) having the same structure output $f_v(v1', 0, 1, n)$ through $f_v(v1, 3, 3, n)$.

Since the N (=16) fading estimation units use the same output values from the ROMs 221 through 223, as is shown in the configuration in FIG. 6, an output value need only be stored in one of the ROMS. In the arrangement in FIG. 6 are circuits 231 and 233 wherein the dividers 201 through 203 and the multipliers 211 through 213 are provided for use in common.

Referring back to FIG. 2, the compensator 30 is a divider. The compensator 30 calculates $\{I(n)+jQ(n)\}/f_v(v1', v1', v2, n)$ (expression (1)), and outputs i(v1', v1, v2, n)+jq(v1', v1, v2, n). The selector 4 has the function of selecting and outputting one of 16 inputs. That is, the selector 4 selects from among the 16 inputs the i(v1', v1, v2, n)+jq(v1', v1, v2, n) having the most likelihood.

An input number to the selector 4 is 4×v1+v2. A select signal having a value of 0 to 15 is transmitted by the likelihood determining circuit 3. Similarly, the values (0 through 15) of the select signals correspond respectively to 4×v1'+v2.

The likelihood determining circuit 3 will now be described while referring to FIG. 3. N likelihood determining circuits 300 through 30(N-1) having the same structure are provided that correspond with the compensators 30 through 3(N-1). The likelihood determining circuit 300 will be explained as an example. The timing for the output i(v1', v1, v2, n)+jq(v1', v1, v2, n) of the compensator is adjusted by a D-FF 311, and is transmitted to a determining circuit 312. The determining circuit 312 outputs a nearest signal point.

For QPSK, one of four signal points ±1±j is output. As is shown in Table 1 below, this is determined by signs for the elements [real axis I(n), imaginary axis Q(n)] of i(v1', v1, v2, n)+jq(v1', v1, v2, n).

| Sign of I(n) | Sign of Q(n) | nearest signal point |
|---|---|---|
| positive | positive | 1 + j |
| positive | negative | 1 − j |
| negative | positive | −1+j |
| negative | negative | −1−j |

A calculator outputs d(v1', v1, v2, n) [expression (12)]. The accumulator accumulates the values in one interval (m) and outputs the interval distance $M_b$ (v0, v1, v2, k) [expression (14)]. The accumulator comprises an adder 314, a selector 315, and two D-FFs 316 and 318. The accumulator is operated as is indicated by a corresponding reference numeral or symbol in the timing chart in FIG. 5.

Finally, a comparator 319 selects the $M_b$(v1', v1, v2, k) having a minimum value from among 16 values, and outputs its input number 4×v1'+v2', wherein v1' has been updated.

Further, a signal point $V_s$ corresponding to v1' is calculated by an arithmetic operation circuit 320 and a D-FF 321, and is output. The timing for the output value is adjusted as is indicated by the timing chart in FIG. 14, and the output serves as a select signal (sel_out) from the D-FF 321 to select the most likelihood output.

FIG. 4 is a block diagram illustrating the controller 5 that employs a system clock $S_{CLK}$ as a master clock to generate a operation timing. First, a frequency divider 51 outputs two synchronous clocks from the system clock $_{CLK}$: one is a clock (clk) having a symbol frequency being synchronous with I(n)+jQ(n), which is obtained by dividing the frequency by two, and the other is a clock (clk/32) having a sampling frequency, which is obtained by dividing the frequency by 64 for use by the extractor 1.

A counter 52 is operated by a clock (clk) and its count value is used as an address for a timing ROM 53. A timing for one sampling interval is then generated. Two NAND circuits 55 and 56 match the leading edges of clocks (clk/32_2) and (clk/32_3) with those of clocks (clk) and (clk/32). These NAND circuits 55 and 56 are operated according to the timing chart in FIG. 5.

Figure 7:
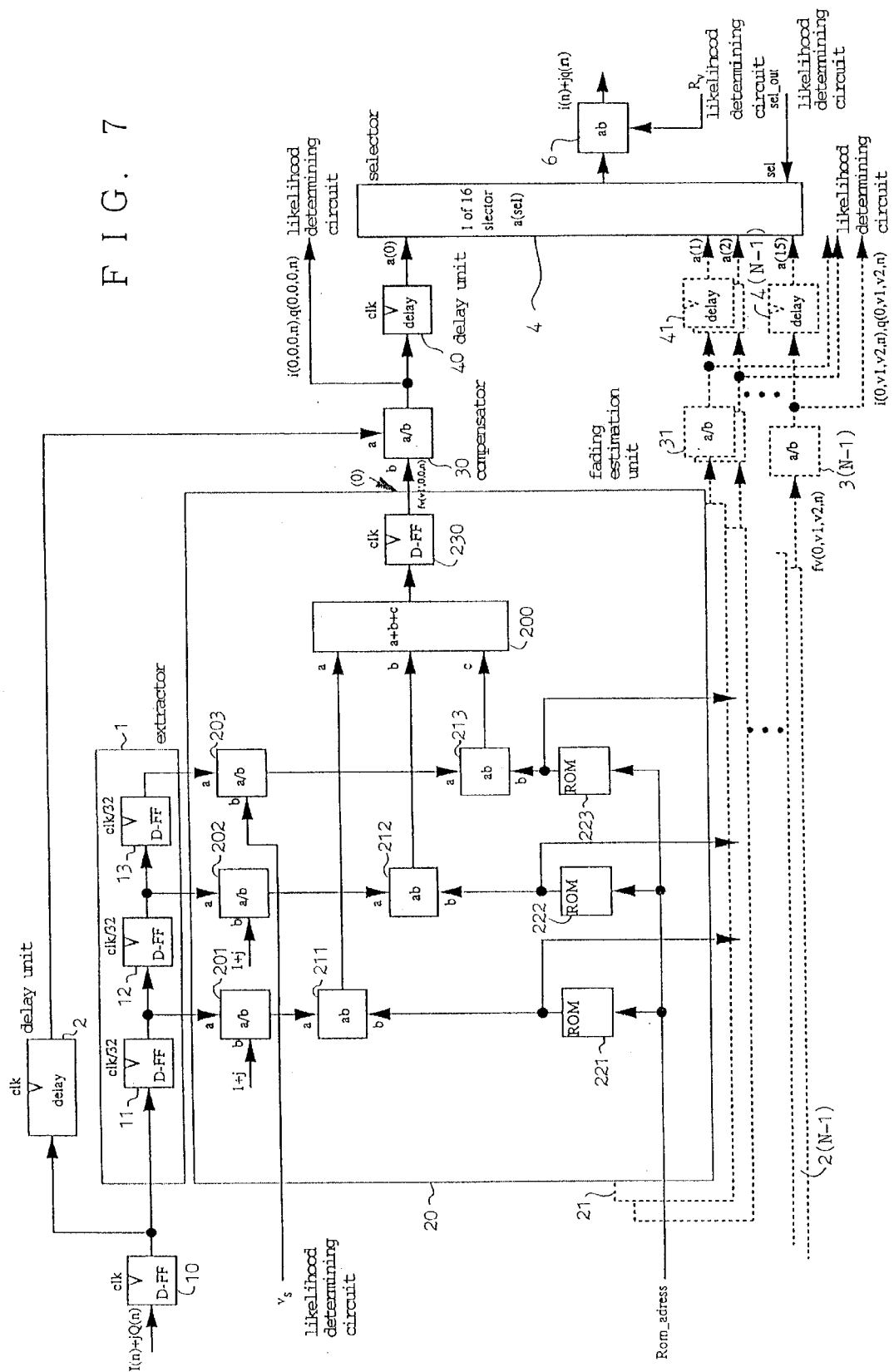
FIG. 7 is a detailed block diagram illustrating a second example arrangement in FIG. 1 according to the first embodiment of the present invention.
Figure 8:
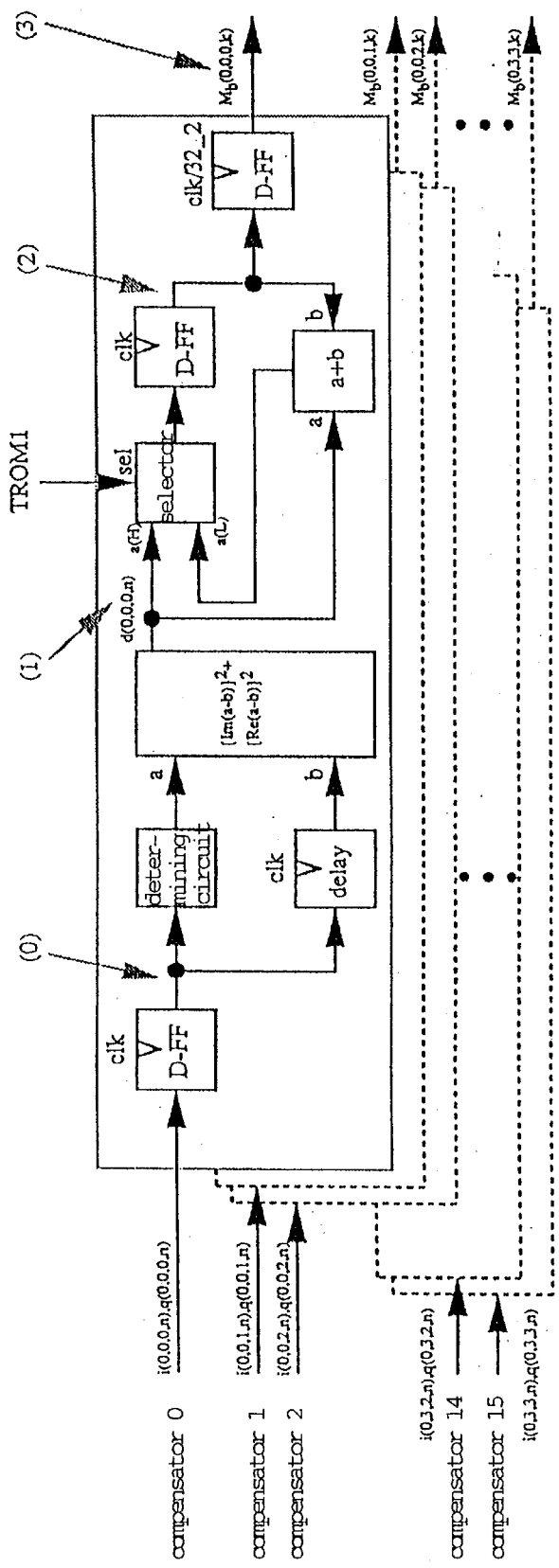
FIG. 8 is a detailed block diagram illustrating a second example likelihood determining circuit in FIG. 1.
Figure 9:
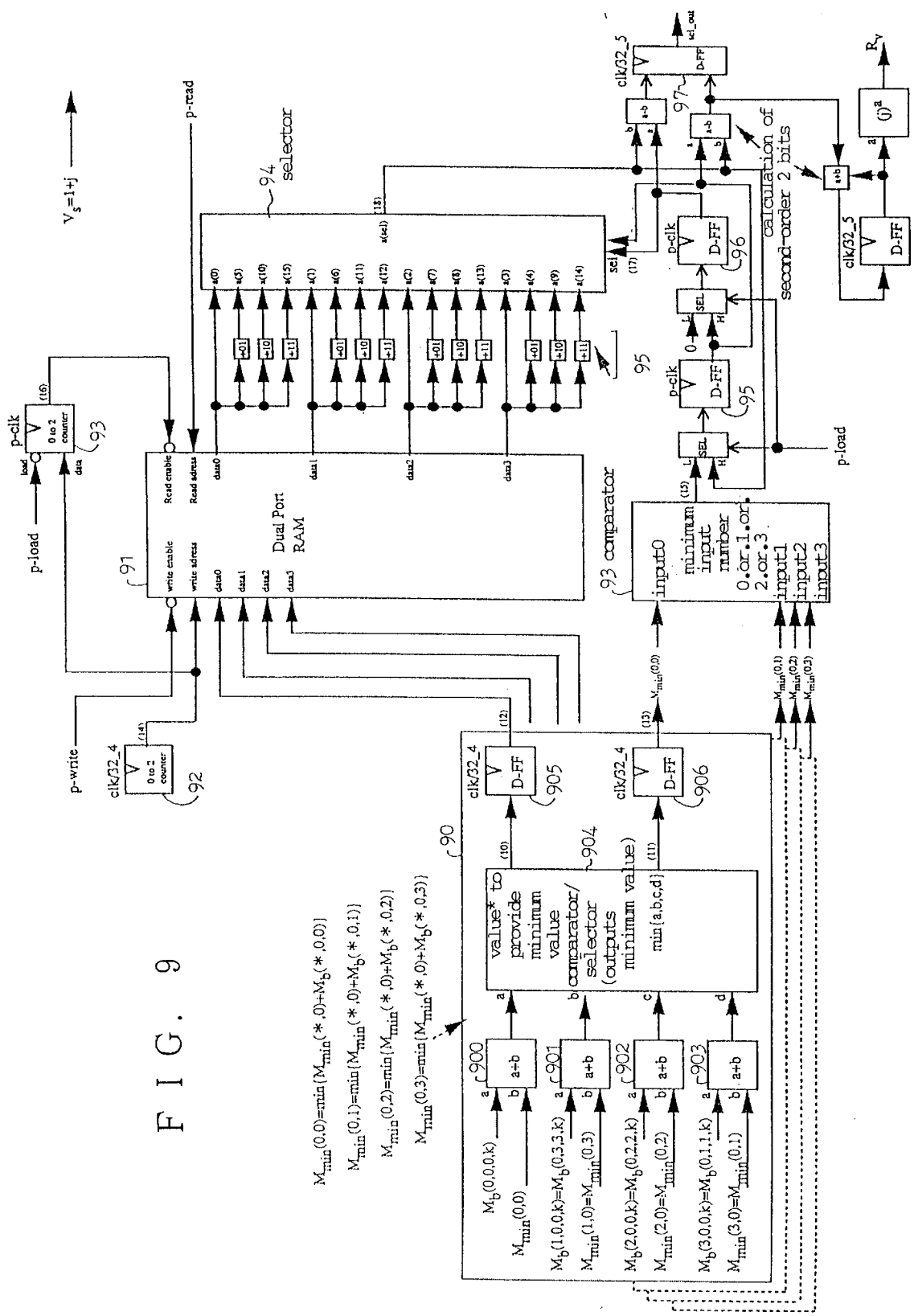
FIG. 9 is a detailed block diagram illustrating a likelihood determining circuit that is used for a Viterbi-algorithm.
Figure 10:
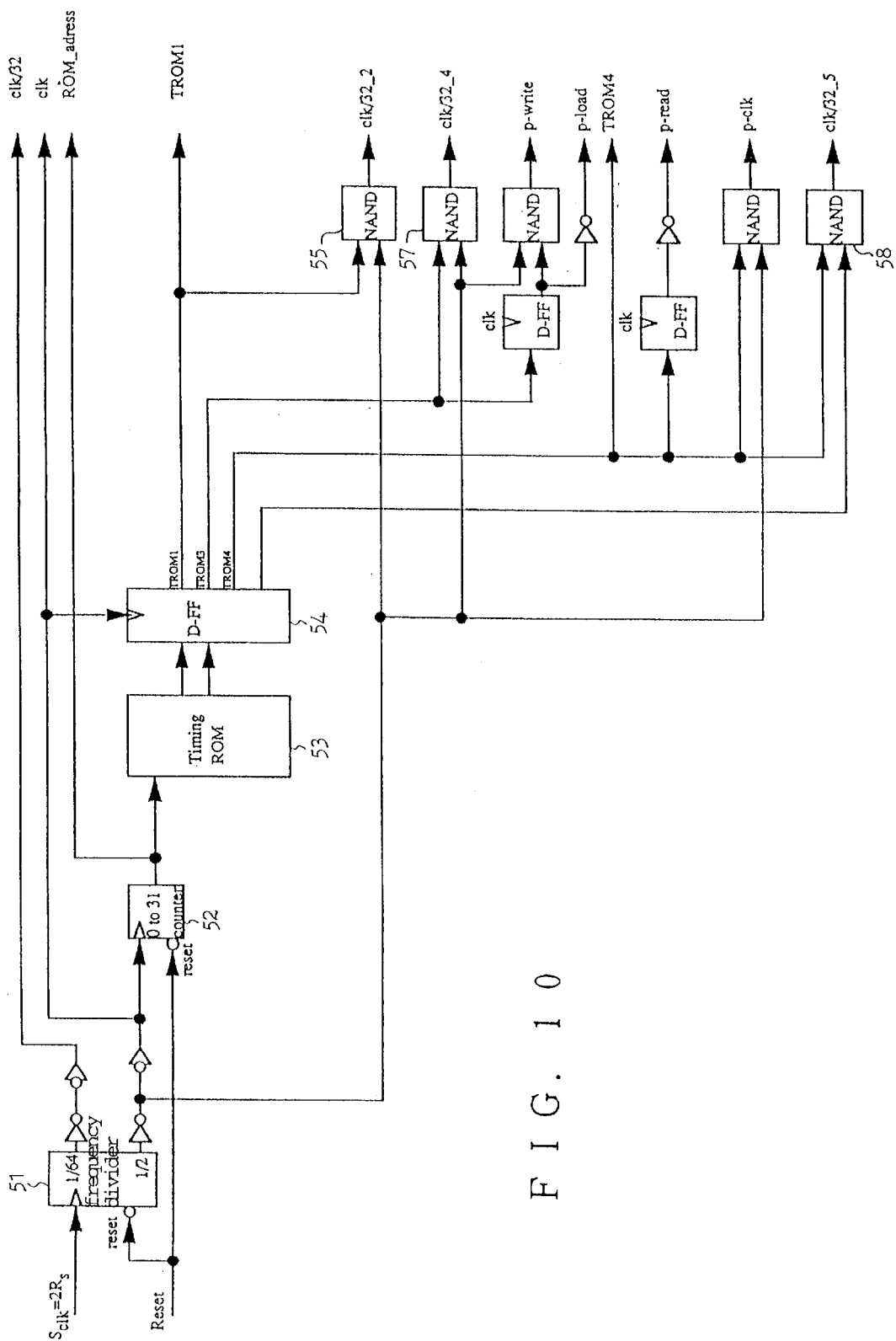
FIG. 10 is a detailed block diagram illustrating a second example controller in FIG. 1.

In FIGS. 7 through 9 is shown a likelihood determining circuit 3 that employs a path distance $M_p$ and c=3. FIG. 10 is a timing chart.

The configuration shown in FIG. 7 is almost the same as the previously described configuration in FIG. 2. A difference between them is that the output of a selector 4 and the output ($R_v$) of a likelihood determining circuit 3 are multiplied by a multiplier 6 to determine a final output. This is because, for a path distance, v1' is not immediately acquired, as is described in the first embodiment, and v0 can not be determined.

As is shown in FIG. 9, which will be referred to later, $V_s$ is therefore fixed as $V_s$=1+j (v0=0).

The second example of the likelihood determining circuit 3 that employs the path distance $M_p$ is shown in FIGS. 8 and 9. FIG. 8 is a diagram for only the portion that calculates the interval distance $M_b$ in FIG. 3 that has been already described. The circuit shown in FIG. 9 includes an ACS section 90, a path memory, and a trace-back section according to the Viterbi-algorithm.

The ACS section 90 has adders 900 through 903 at the first stage, a comparator and selector 904 at the next stage, and D-FFs 905 and 906 for adjusting the output timing of the comparator and selector 904.

The path memory includes a dual-port RAM 91 in which a selection number is stored, and a counter 92 for outputting a write address. The trace-back section has a comparator 93, a selector 94, a read counter 93 for the dual-port RAM 91, shift registers including D-FFs 95 and 96, and a D-FF 97 for adjusting the timing for the final output (sel_out).

In the ACS section 90, the four adders 900 through 903 at the first stage receive the output from the portion for calculating the interval distance $M_p$ in FIG. 8, and calculate four values by using expression (23). The comparator and selector 904 at the next state calculates the min-function on the right side of expression (25), and outputs the result and $w_{i-2}$ at that time. Finally, the D-FF 906 adjusts the timings of these outputs.

The path memory section is constituted mainly by the dual port RAM 91 in which expression (28) is stored. Since c=3 in this embodiment, and only values up to $w_{i-4}$ need be stored, expression (28) is rewritten as the following expression:

$$P_m\{0, w_i, (i-2+\alpha).\text{mod}.3\}=w_{i-2} \qquad (30),$$

where α is an initial value (either 0, 1, or 2) for a write address. Therefore, {i−2+α}.mod.3} is a write count value. Values at the input and output ports (data 0 through data 3) of the dual port RAM 91 indicate $w_i$.

When $w_{i-1} \neq 0$, expression (29) is calculated to yield expression (31) below.

$$P_m\{w_{i-1}, w_i, (i-2+\alpha).\text{mod}.3\}=\{p_m(0, w_i-w_{i-1}, (i-2+\alpha).\text{mod}.3)+w_{i-1}\}.\text{mod}.4 \qquad (31)$$

An adder 95 adds $w_{i-1}$ (2 bits) to a value (2 bits) read from the dual-port RAM 91.

Figure 11:
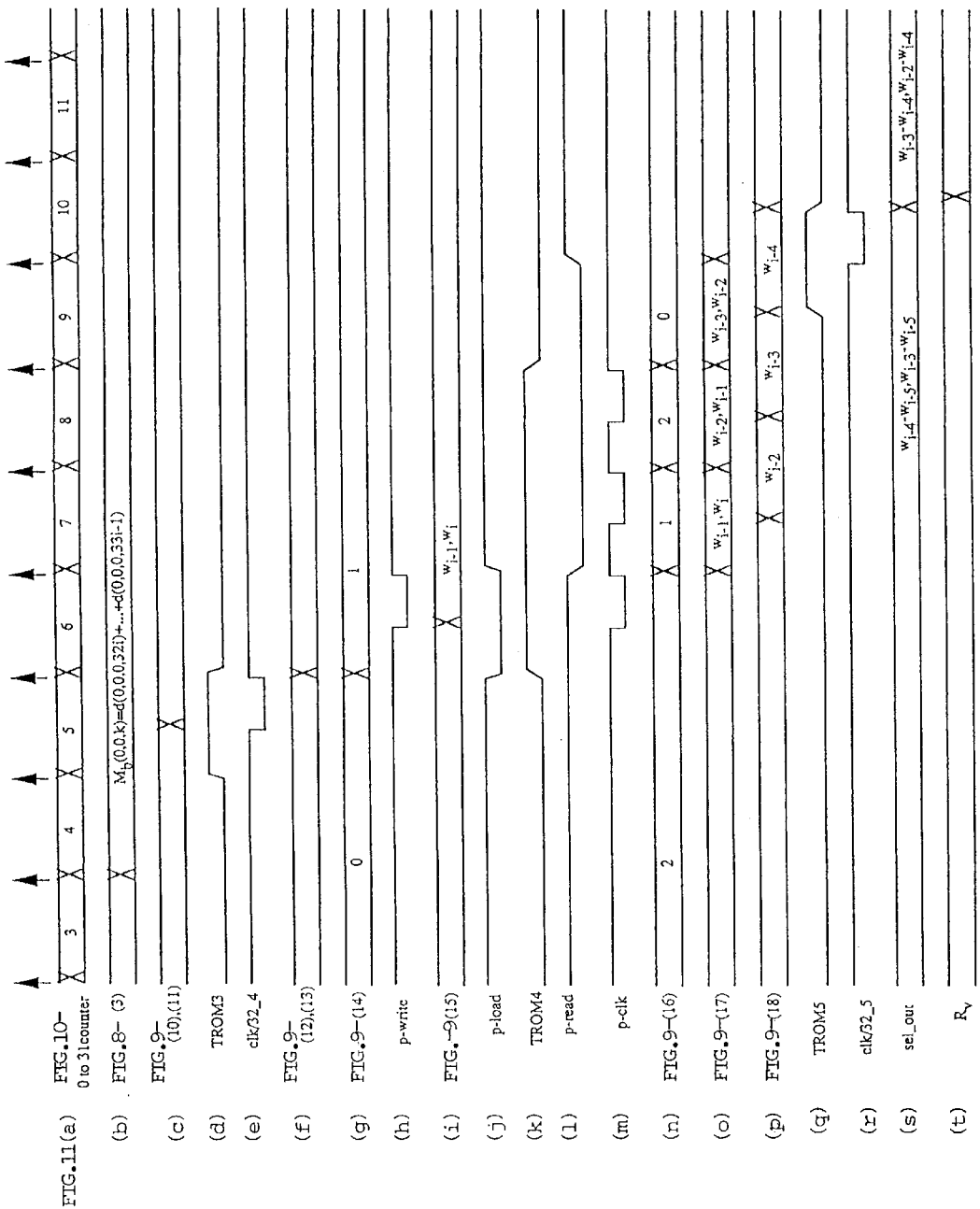
FIGS. 11(a)–11(t) are timing charts for the operations of the individual sections shown in 8.

The comparator 93 in the trace-back section outputs $w_{i-1}$ and $w_i$ to provide the minimum value for expression (26). According to the timing chart of (a) through (t) in FIG. 11, based on these values, the selector 94 that is connected to the dual-port RAM 91 outputs $w_{i-4}$, $w_{i-3}$, and $w_{i-2}$, with which a minimum path distance can be acquired.

Further, as was previously described, since phase uncertainty is present and there are only 16 paths, $w_{i-3}$–$w_{i-4}$, $w_{i-2}$–$w_{i-4}$ serves as sel_out in the long run and $R_v$ is a rotation vector.

In FIG. 10 is shown an example arrangement of the controller 5 in FIG. 9. Compared with the controller 5 in FIG. 4, NAND circuits 57 and 58 are additionally provided to supply clocks CLK/32_4 and CLK/32_5 to the D-FFs 906, 906 and 97 in FIG. 9.

Although expression (14) yields a sum of distances for all the signals, the characteristic is not deteriorated very much by performing intermittent calculation when m is a large number. As an example, assume that a distance is to be calculated for every other symbol. Expression (14) is then rewritten as expression (32) below.

$$M_b(v0, v1, v2, k) = \sum_{g=1}^{m/2} d(v0, v1, v2, mk-2g) \qquad (32)$$

Figure 12:
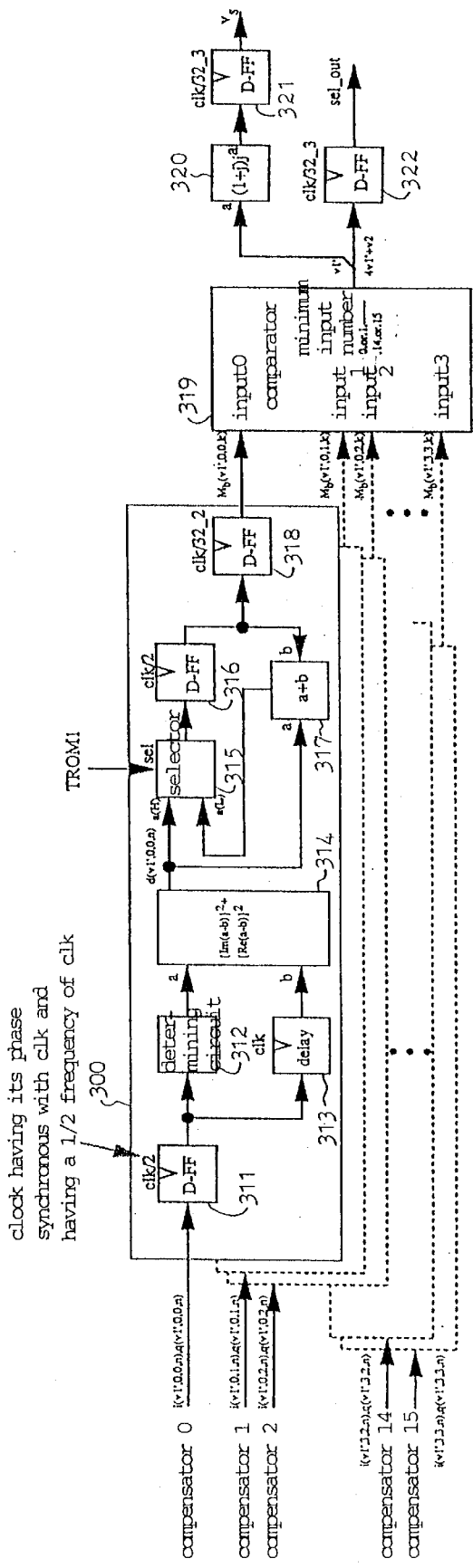
FIG. 12 is a detailed block diagram illustrating a third example likelihood determining circuit in FIG. 1.

Comparing the configuration of the likelihood determining circuit 3 in FIG. 12 with that in FIG. 3, clock frequencies for the D-FFs 311 and 316 can be reduced by half.

Figure 13:
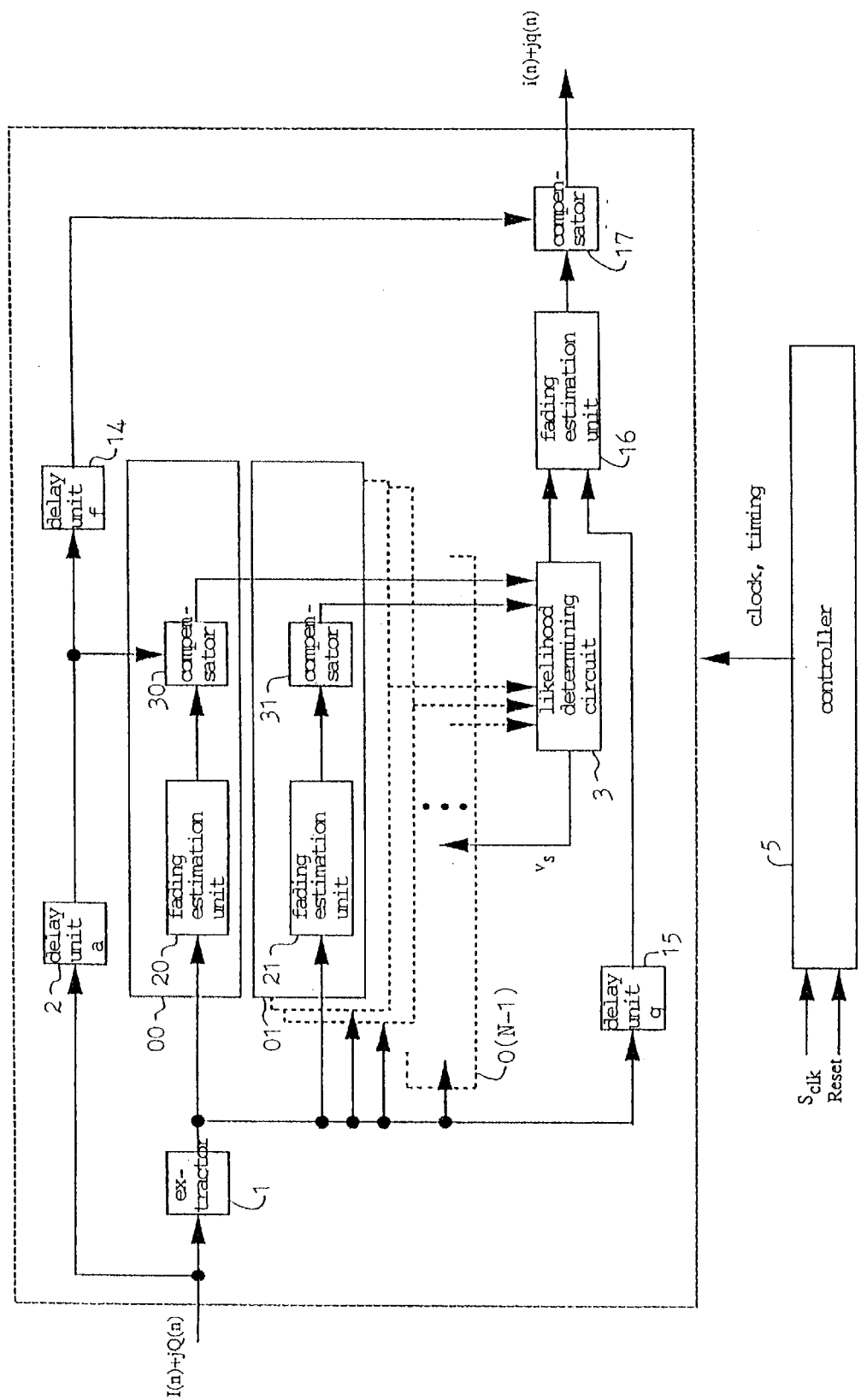
FIG. 13 is a block diagram illustrating a fading equalizer according to a second embodiment of the present invention.

FIG. 13 is a diagram illustrating a fading equalizer according to a second embodiment of the present invention. A difference from the first embodiment is that the delay units 40 through 4(N−1) are not employed to store the outputs of N compensators 30 through (N−1), which are transmitted to a likelihood determining circuit 3.

The final output selection, which is performed by the selector 4 in FIG. 1, is not performed. Instead, as is shown in FIG. 13, the outputs v0', v1' and v2' of the likelihood determining circuit 3 are input to a fading estimation unit 16 to calculate $f_v$(v0', v1', v2', n).

The calculation time is required for the likelihood determining circuit 3 to acquire v0', v1' and v2'. The output of an extractor 1 is delayed by a delay unit 15, and the input timing to the fading estimation unit 16 is adjusted. The output of the fading estimation unit 16 is sent to a compensator 17, and i(v0', v1', v2', n) and q(v0', v1', v2', n) are acquired.

At this time, since time is required for the fading estimation unit 16 to calculate $f_v$(v0', v1', v2', n), the output of a delay unit 2 is delayed by a delay unit 14 to adjust the input timing to that of the compensator 17.

Figure 14:
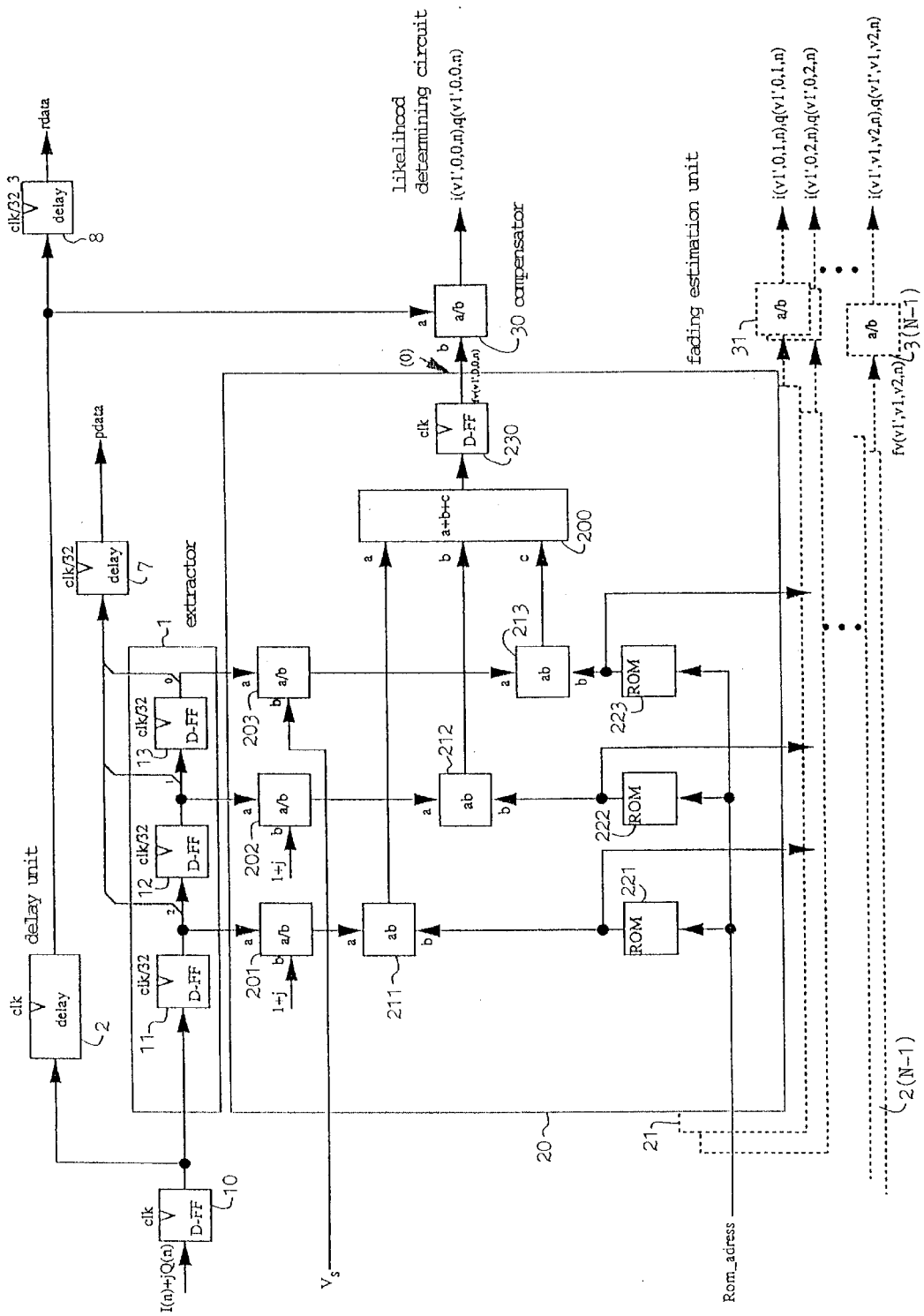
FIG. 14 is a detailed block diagram illustrating a first example arrangement in FIG. 13 (except for a likelihood determining circuit and a controller)

FIG. 14 is a detailed block diagram illustrating the configuration of the second embodiment in FIG. 13. The configuration in FIG. 14 is substantially the same as that in FIG. 2, except that the delay units 40 through 4(N−1) for storing the outputs from the compensators 30 through 3(N−1) and the selector 4 that is connected thereto are not provided.

Further, as is shown in FIG. 14, the output of the extractor 1 and the inputs to the compensators 30 through 3(n−1) are respectively stored by delay units 7 and 8, which output them as (pdata, rdata).

Figure 15:
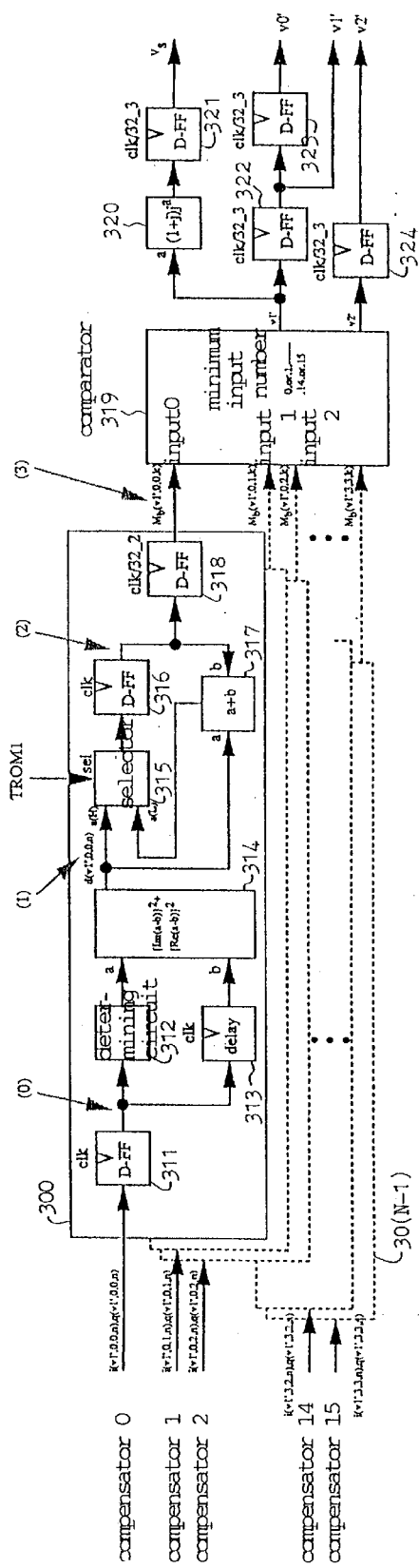
FIG. 15 is a detailed block diagram illustrating a first example likelihood determining circuit in FIG. 13.

The arrangement shown in FIG. 15 is substantially the same as that in FIG. 3, except for the structure at the back of the comparator 319. As is shown in FIG. 15, although v1' and v2' are the same as those in the first embodiment in FIG. 3, v1' is delayed by two-stages D-FFs 322 and 323, and the resultant signal is output as v0.

v0' is substantially the same as the $V_s$ that is used for fading estimation in FIG. 14. When fading estimation and compensation are performed by using v0', v1' and v2', i(n)+jq(n), as acquired in FIG. 2, is obtained.

Figure 16:
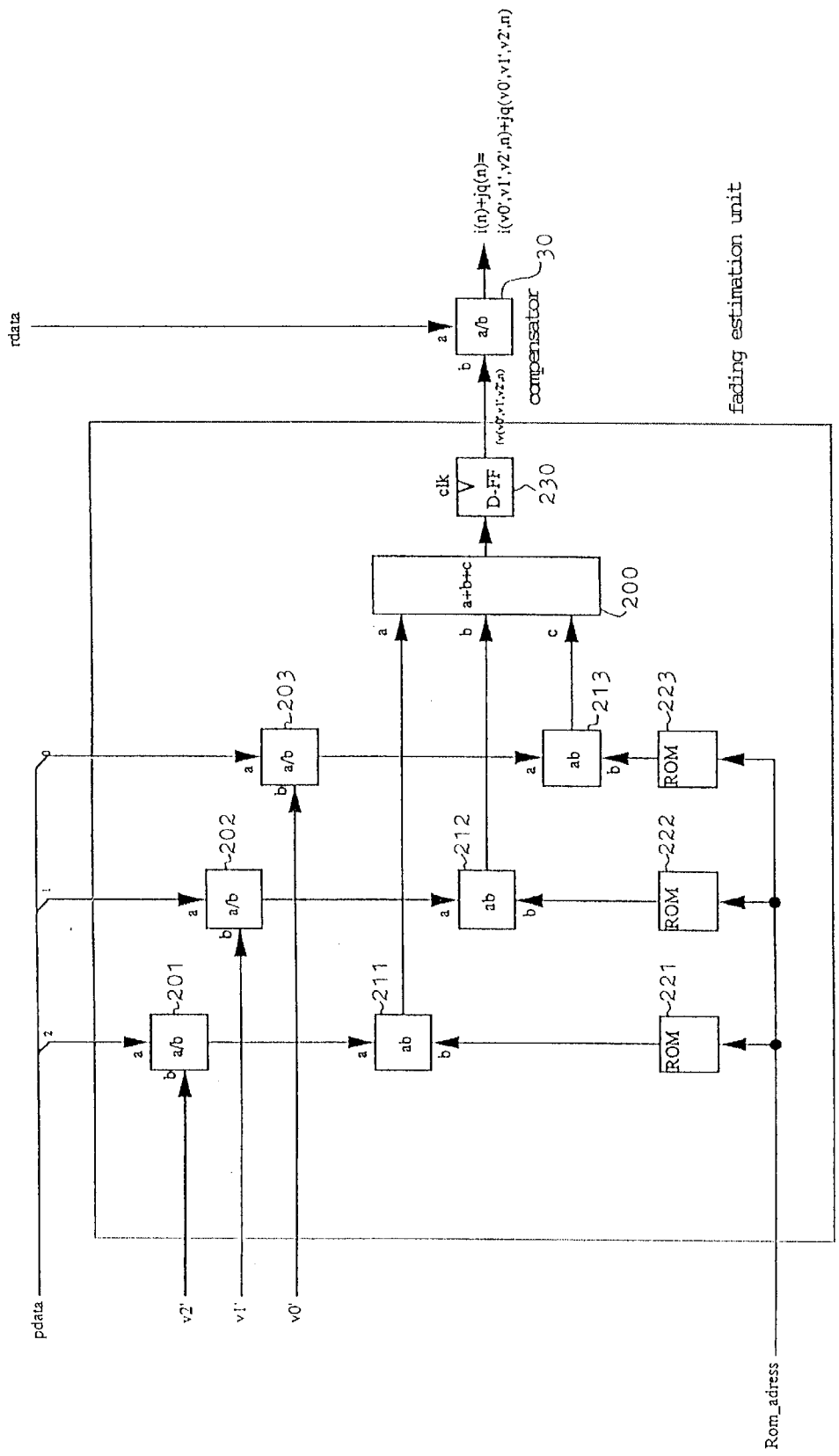
FIG. 16 is a detailed block diagram illustrating a first example controller in FIG. 13.

In FIG. 16, fading estimation and compensation is performed by using the v0', v1' and v2' in FIG. 15 and the (pdata, rdata) in FIG. 14 to obtain i(n)+jq(n), as is acquired in FIG. 2.

Figure 17:
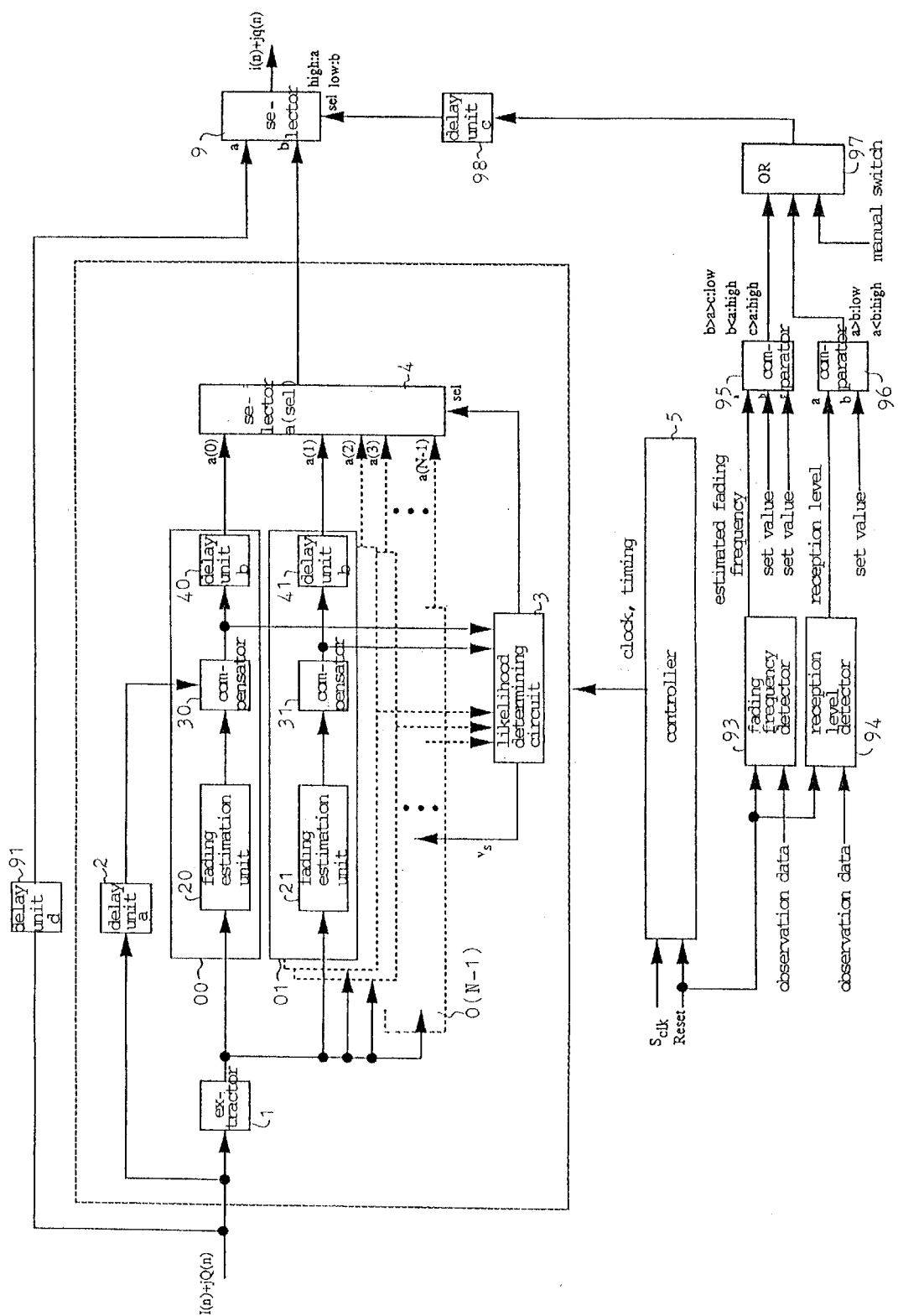
FIG. 17 is a block diagram illustrating a fading equalizer according to a third embodiment of the present invention.

FIG. 17 is a diagram illustrating a fading equalizer according to a third embodiment of the present invention. Compared with the arrangement in FIG. 1, at the last stage, a selector 9 selects the output of a fading equalizer and a signal {I(n)+jQ(n)}, for which fading compensation is not performed. The select signal can be a logical sum under the following three conditions. When it is true, {I(n)+jQ(n)} is selected. The timings of signals (a and b) input to the selector 9 are adjusted by a delay unit 91, and the timing of a select signal (sel) is adjusted by a delay unit 98.

More specifically, the first condition is that an estimated fading frequency must be outside the range of a set frequency. When a fading frequency is too low, the effect obtained by fading compensation is not very remarkable, but when the fading frequency is too high, the fading may not be compensated for.

The second condition is that an estimated average reception signal level is lower than a set level. When the average reception level is lower, the effect provided by fading compensation is small, and the characteristic may be better than when the fading compensation is not performed.

The third condition is that a manual switch is employed to select an operation. A user switches the operation as he or she decides, while taking the environment into account.

Differences between the third embodiment and the first embodiment are only a fading frequency, a reception level, and a manual switch in accordance with the above three conditions. The fading equalizer has the same structure as that in the first embodiment. An explanation will be given only for a fading frequency detector 93 and a reception level detector 94.

Since a fading frequency strongly correlates with a velocity, the fading frequency detector can be provided by using the velocity as observation data. The reception level detector is provided by using an RSSI (Radio Signal Strength Indicator) that is output by an amplifier in a middle frequency band. As another example, when the output of an OR circuit 97 in FIG. 17 is high, the outputs of the compensators 40 through 4(N−1) are not selected, and a power supply or a clock can be halted.

As is described above, according to the present invention, the fading equalizer can estimate fading without deterioration of data transfer efficiency. With this fading equalizer, fading compensation can be performed. Further, an occurrence of a floor phenomenon of a bit error rate (BER) can be prevented, and the functions of a receiver that employs such a fading equalizer can be enhanced.

The above described embodiments are provided only for the explanation of the present invention. The scope of the present invention is not limited to these embodiments, and is defined by the attached claims. Other techniques that are the equivalent of those specified in the claims also fall within the scope of the present invention.

What is claimed is:

1. A fading equalizer for demodulating a modulation signal modulated with phase or amplitude, or both of a radio frequency carrier according to data to be transmitted, wherein a series of symbols of quadrature I(n) and Q(n) (n: natural number) and an assumed maximum fading frequency is F(max), the fading equalizer comprising:

a symbol extractor for sampling the series of symbols of quadrature detected data at time intervals of $1/(2F_{max})$ or smaller to extract symbols of the quadrature detected data;

N fading estimation units for estimating a series of fading vectors $F_v(n)$ by using tentative transmission data, data for which likelihood is determined, and the extracted symbols;

N compensators, each for performing fading compensation for the series of symbols of quadrature detected data by using the series of fading vectors $F_v(n)$ that are estimated in the N fading estimation units; and a first selector for selecting one of N compensated series of symbols of quadrature detected data obtained by the N compensators, the number N corresponding to a number of combinations of all possible symbols for a predetermined number of data sampled by the symbol extractor.

2. The fading equalizer according to claim 1, further comprising:

a signal level detector for measuring a received signal level;

a first comparator for comparing the received signal level detected by said signal level detector with a first predetermined value;

a fading detector for detecting a fading frequency;

a second comparator for comparing the fading frequency detected by said fading detector with a second predetermined value; and a second selector for selecting and outputting either the one of N compensated series of symbols of quadrature detected data selected from said first selector, or the series of symbols of quadrature detected data, according to outputs of the first and second comparators.

3. The fading equalizer according to claim 2, wherein said symbol extractor is constituted by a plurality of D-FFs stages.

4. The fading equalizer according to claim 3, wherein each of the N fading estimation units includes;
a division circuit for performing division of the outputs of the plurality of D-FFs stages with sampling signals for the series of symbols;
a ROM for storing an impulse response of a filter; and
a multiplication circuit for multiplying the output of the division circuit and the impulse response read from the ROM.

5. The fading equalizer according to claim 4, wherein said ROM is provided in common for the N fading estimation units.

6. The fading equalizer according to claim 4,
wherein said division circuit and the multiplication circuit are constituted in common by a single circuit for performing multiplication and division.

7. The fading equalizer according to claim 1, wherein said symbol extractor is constituted by a plurality of D-FFs stages.

8. The fading equalizer according to claim 7,
wherein each of said N fading estimation units includes;
a division circuit for performing division of outputs of the plurality of D-FFs stages with sampling signals for the series of symbols;
a ROM for storing an impulse response of a filter; and
a multiplication circuit for multiplying the outputs of the division circuit and the impulse response read from the ROM.

9. The fading equalizer according to claim 8,
wherein said ROM is provided in common for the N fading estimation circuits.

10. The fading equalizer according to claim 8,
wherein said division circuit and the multiplication circuit are constituted in common by a single circuit for performing the multiplication and division.

11. A fading equalizer for demodulating a modulation signal modulated with phase or amplitude, or both of a radio frequency carrier according to data to be transmitted, wherein a series of symbols of quadrature detected data I(n) and Q(n) (n: natural number) and an assumed maximum fading frequency is F(max), the fading equalizer comprising:
a symbol extractor for performing sampling of the series of symbols of quadrature detected data at time intervals of $1/(2F_{max})$ or smaller to extract symbols of the quadrature detected data;
N first fading estimation units corresponding to a number of combinations of all transmitted signals for estimating a series of fading vectors $F_v(n)$ by using tentative transmission signals, signals for which likelihood is determined, and extracted symbols;
N compensators for performing fading compensation for the series of symbols of quadrature detected data by using the series of fading vectors $F_v(n)$ that are estimated in the N first fading estimation units;
a second fading estimation unit for estimating fading based on the signals for which likelihood is determined; and
a second compensator for performing fading compensation on the series of symbols of quadrature detected data by using estimated data that are obtained by the second fading estimation unit.

12. The fading equalizer according to claim 11, further comprising:
a signal level detector for measuring a received signal level;
a first comparator for comparing the received signal level detected by said signal level detector with a first predetermined value;
a fading detector for detecting a fading frequency;
a second comparator for comparing the fading frequency detected by said fading detector with a second predetermined value; and
a second selector for selecting and outputting either the compensated series of symbols of quadrature detected data output from said second compensator, or the series of symbols of quadrature detected data, according to outputs of the first and second comparators.

13. The fading equalizer according to claim 11, wherein said symbol extractor is constituted by a plurality of D-FFs stages.

14. The fading equalizer according to claim 13,
wherein each of the N fading estimation units includes;
a division circuit for performing division of the outputs of the plurality of D-FFs stages with sampling signals for the series of symbols;
a ROM for storing an impulse response of a filter; and
a multiplication circuit for multiplying the output of the division circuit and the impulse response read from the ROM.

15. The fading equalizer according to claim 14, wherein said ROM is provided in common for the N fading estimation units.

16. The fading equalizer according to claim 14, wherein said division circuit and the multiplication circuit are constituted in common by a single circuit for performing multiplication and division.

17. A fading equalizer for demodulating a modulation signal modulated with phase or amplitude, or both of a radio frequency carrier according to data to be transmitted, wherein a series of symbols of quadrature detected data I(n) and Q(n) (n: natural number) and an assumed maximum fading frequency is F(max), the fading equalizer comprising:
a symbol extractor for sampling the series of symbols of quadrature detected data at time intervals of $1/(2F_{max})$ or smaller to extract symbols of the quadrature detected data;
N fading estimation units for estimating a series of fading vectors $F_v(n)$ by using tentative transmission data, data for which likelihood is determined, and the extracted symbols;
N compensators for performing fading compensation for the series of symbols of quadrature detected data by using the series of fading vectors $F_v(n)$ that are estimated in the N fading estimation units;
a first delay unit for adjusting timings for the series of symbols of quadrature detected data I(n) and Q(n) that are input to the N compensators;
a selector for selecting one of the series of symbols of quadrature detected data compensated in said N compensators according to a selection signal;
N second delay units for adjusting the timings of the series of symbols of quadrature detected data compensated in said N compensators with the selection signal for the selector; and a likelihood determining circuit for generating the selection signal for said selector, number N corresponding to the number of combinations of all possible symbols for a predetermined number of the data sampled by the symbol extractor.

18. The fading equalizer according to claim 17, wherein said symbol extractor is constituted by a plurality of D-FFs stages.

19. The fading equalizer according to claim 18, wherein each of the N fading estimation units includes;

a division circuit for performing division of the outputs of the plurality of D-FFs stages with sampling signals for the series of symbols;

a ROM for storing an impulse response of a filter; and a multiplication circuit for multiplying the output of the division circuit and the impulse response read from the ROM.

20. The fading equalizer according to claim 19, wherein said ROM is provided in common for the N fading estimation units circuits.

21. The fading equalizer according to claim 19, wherein said division circuit and the multiplication circuit are constituted in common by a single circuit for performing multiplication and division.

* * * * *